US011470279B1

(12) United States Patent
Huang et al.

(10) Patent No.: US 11,470,279 B1
(45) Date of Patent: Oct. 11, 2022

(54) AUTOMATED RECORDING HIGHLIGHTS FOR CONFERENCES

(71) Applicant: Zoom Video Communications, Inc., San Jose, CA (US)

(72) Inventors: Tao Huang, Hangzhou (CN); Xiaoli Song, Sunnyvale, CA (US); Hui Wen, Hangzhou (CN); Melinda Min Xiao-Devins, Fremont, CA (US); Ran Yan, Hangzhou (CN); Fangyi Zhao, Fremont, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/245,988

(22) Filed: Apr. 30, 2021

(51) Int. Cl.
*H04N 7/15* (2006.01)
*G06F 40/289* (2020.01)
*G06F 40/166* (2020.01)
*G11B 27/031* (2006.01)

(52) U.S. Cl.
CPC ........... *H04N 7/155* (2013.01); *G06F 40/166* (2020.01); *G06F 40/289* (2020.01); *G11B 27/031* (2013.01)

(58) Field of Classification Search
CPC ..... H04N 7/155; G06F 40/166; G06F 40/289; G11B 27/031
See application file for complete search history.

(56) References Cited

U.S. PATENT DOCUMENTS

| 11,190,828 B1 | 11/2021 | Gratton et al. |
| 2003/0050927 A1* | 3/2003 | Hussam ............... G06F 16/904 |
| 2014/0129210 A1 | 5/2014 | Convertino et al. |
| 2015/0379134 A1 | 12/2015 | Bax et al. |
| 2016/0321365 A1 | 11/2016 | Duan et al. |
| 2017/0345458 A1 | 11/2017 | Berglund et al. |
| 2018/0359293 A1 | 12/2018 | Faulkner et al. |
| 2019/0082214 A1 | 3/2019 | Kim et al. |
| 2019/0327103 A1 | 10/2019 | Niekrasz |

(Continued)

OTHER PUBLICATIONS

Automated Meeting Minutes, Business Meeting app, deepTalk, Automated Meeting Notes For In-Person and Remote Conversations, https://deeptalk-ai.com, retreived Feb. 25, 2021, 15 pages.

(Continued)

*Primary Examiner* — Mishawn N. Hunter
(74) *Attorney, Agent, or Firm* — Young Basile Hanlon & MacFarlane, P.C.

(57) ABSTRACT

A transcript of a conference (e.g., a video conference, an audio conference, or a telephone call with two or more participants) is processed to extract a conference summary. The transcript includes strings that are associated with respective timestamps and respective speaker identifiers. Speaker segments—sequences of consecutive strings attributed to the same speaker—are identified in the transcript. A speaker segment is selected based on its duration in time and one or more strings are selected from with the selected speaker segment for inclusion in the conference summary. A short video conference summary or a short audio conference summary is then generated using timestamps from the transcript associated with strings (e.g., sentences) that have been selected for inclusion in the conference summary. The short video or audio summary may be presented to users to enable efficient storage and transmission of information from the conference within a unified communications system.

20 Claims, 24 Drawing Sheets

(56) References Cited

U.S. PATENT DOCUMENTS

2019/0341050 A1    11/2019   Diamant et al.
2019/0379942 A1    12/2019   Han et al.
2020/0196028 A1     6/2020   Kuehne, Jr. et al.
2021/0058436 A1*    2/2021   Mombourquette .................
                                                      G06K 9/00302

OTHER PUBLICATIONS

Webex, Review and Manage Highlights Created by Using Webex Assistant for Meetings, Jan. 15, 2021, 4 pages.

Webex, Create or Delete Meeting Highlights During a Cisco Webex Meeting, Jan. 22, 2021, 3 pages.

Zoom Blog, UCaaS Platform: What's New for Meetings, Phone & Webinar, https://blog.zoom.us/ucaas-platform-whats-new-for-meetings-phone-webinar-zoomtopia-2020/, Oct. 14, 2020, 7 pages.

Secure & Manage Video Conference Recordings With Panopto, https://www.panopto.com/features/video-recording/meeting-recording/, retrieved Feb. 25, 2021, 15 pages.

Automated Meeting Notes for Zoom with Live Transcription, https://deeptalk-ai.com/product-zoom.html, retrieved Feb. 25, 2021, 6 pages.

Free Video Conferencing & Online Meetings, https://www.webex.com/video-conferencing, retrieved Feb. 25, 2021, 12 pages.

Wikipedia, Automatic Summarization, https://en.wikipedia.org/wiki/Automatic_summarization#, Mar. 9, 2021, 14 pages.

Otter Voice Meeting Notes, Live Transcription for Zoom Meetings and Webinars, https://otter.ai/zoom, retrieved Feb. 25, 2021, 7 pages.

Invitation To Pay Additional Fees And, Where Applicable, Protest Fee dated Jul. 25, 2022 in corresponding PCT Application No. PCT/US2022/025720.

* cited by examiner

```
WEBVTT 1
00:00:00.000 --> 00:00:00.359
Alan Lee: Please.

2
00:00:02.550 --> 00:00:05.970
Alan Lee: And then when we get to the end, we'll see where we stand.

3
00:00:07.259 --> 00:00:07.980
John Ma: Sounds good.

4
00:00:10.679 --> 00:00:13.320
Alan Lee: Awesome, so when you're ready, please give us an update 5
00:00:13.740 --> 00:00:25.710
Kiran: Sorry, before we, before we begin, I just wanted to make sure. Right. I mean, within the hour before this meeting, I sent a long script to Tom after a meeting with him.

6
00:00:26.580 --> 00:00:35.610
Kiran: So if people could read it and commented on it. But Michael I don't know how you want to deal with it for the read through maybe we just read through what we've got here first.
```

AUTOMATED RECORDING HIGHLIGHTS FOR CONFERENCES

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for automated recording highlights for conferences.

One aspect of this disclosure is a method that includes obtaining a transcript of a conference, wherein the transcript includes strings with respective timestamps; inputting strings from the transcript to a machine learning model to obtain respective scores for the strings; selecting a string for highlighting from the transcript based on respective scores of strings; selecting a video excerpt from a video of the conference based on the respective timestamp of the selected string; and generating a video conference summary as a sequence of video excerpts from the video, including the selected video excerpt.

One aspect of this disclosure is a system that includes a processor, and a memory, wherein the memory stores instructions executable by the processor to: obtain a transcript of a conference, wherein the transcript includes strings with respective timestamps; input strings from the transcript to a machine learning model to obtain respective scores for the strings; select a string for highlighting from the transcript based on respective scores of strings; select a video excerpt from a video of the conference based on the respective timestamp of the selected string; and generate a video conference summary as a sequence of video excerpts from the video, including the selected video excerpt.

One aspect of this disclosure is a non-transitory computer-readable storage medium, comprising executable instructions that, when executed by a processor, facilitate performance of operations, including inputting strings from the transcript to a machine learning model to obtain respective scores for the strings; selecting a string for highlighting from the transcript based on respective scores of strings; selecting a video excerpt from a video of the conference based on the respective timestamp of the selected string; and generating a video conference summary as a sequence of video excerpts from the video, including the selected video excerpt.

One aspect of this disclosure is a method that includes obtaining a transcript of a conference, wherein the transcript includes strings with respective timestamps; determining respective scores for strings of the transcript based on content of the strings; selecting a string for highlighting from the transcript based on respective scores of strings; selecting an audio excerpt from a recording of the conference based on the respective timestamp of the selected string; and generating an audio conference summary as a sequence of audio excerpts from the recording, including the selected audio excerpt.

One aspect of this disclosure is a system that includes a processor, and a memory, wherein the memory stores instructions executable by the processor to: obtain a transcript of a conference, wherein the transcript includes strings with respective timestamps; determine respective scores for strings of the transcript based on content of the strings; select a string for highlighting from the transcript based on respective scores of strings; select an audio excerpt from a recording of the conference based on the respective timestamp of the selected string; and generate an audio conference summary as a sequence of audio excerpts from the recording, including the selected audio excerpt.

One aspect of this disclosure is a non-transitory computer-readable storage medium, comprising executable instructions that, when executed by a processor, facilitate performance of operations, including obtaining a transcript of a conference, wherein the transcript includes strings with respective timestamps; determining respective scores for strings of the transcript based on content of the strings; selecting a string for highlighting from the transcript based on respective scores of strings; selecting an audio excerpt from a recording of the conference based on the respective timestamp of the selected string; and generating an audio conference summary as a sequence of audio excerpts from the recording, including the selected audio excerpt.

One aspect of this disclosure is a method that includes obtaining a transcript of a conference, wherein the transcript includes strings with respective timestamps and respective speaker identifiers; determining respective scores for strings of the transcript based on content of the strings; identifying speaker segments with respective durations in the transcript, wherein a speaker segment is a sequence of consecutive strings in the transcript that have the same speaker identifier; selecting a speaker segment from the transcript based on a respective duration of the speaker segment; selecting a string for highlighting from the selected speaker segment based on respective scores of strings in the speaker segment; selecting a video excerpt from a video of the conference based on the respective timestamp of the selected string; and generating a video conference summary as a sequence of video excerpts from the video, including the selected video excerpt.

One aspect of this disclosure is a system that includes a processor, and a memory, wherein the memory stores instructions executable by the processor to: obtain a transcript of a conference, wherein the transcript includes strings with respective timestamps and respective speaker identifiers; determine respective scores for strings of the transcript based on content of the strings; identify speaker segments with respective durations in the transcript, wherein a speaker segment is a sequence of consecutive strings in the transcript that have the same speaker identifier; select a speaker segment from the transcript based on a respective duration of the speaker segment; select a string for highlighting from the selected speaker segment based on respective scores of strings in the speaker segment; select a video excerpt from a video of the conference based on the respective timestamp of the selected string; and generate a video conference summary as a sequence of video excerpts from the video, including the selected video excerpt.

One aspect of this disclosure is a non-transitory computer-readable storage medium, comprising executable instructions that, when executed by a processor, facilitate performance of operations, including obtaining a transcript of a conference, wherein the transcript includes strings with respective timestamps and respective speaker identifiers; determining respective scores for strings of the transcript based on content of the strings; identifying speaker segments with respective durations in the transcript, wherein a speaker segment is a sequence of consecutive strings in the transcript that have the same speaker identifier; selecting a speaker segment from the transcript based on a respective duration of the speaker segment; selecting a string for highlighting from the selected speaker segment based on respective scores of strings in the speaker segment; selecting a video excerpt from a video of the conference based on the respective timestamp of the selected string; and generating a video conference summary as a sequence of video excerpts from the video, including the selected video excerpt.

One aspect of this disclosure is a method that includes obtaining a transcript of a conference, wherein the transcript includes strings with respective timestamps; determining respective sentence vectors for strings of the transcript, wherein a sentence vector has elements corresponding to words present in the transcript that are proportional to a number of occurrences of the word in the string and inversely proportional to a number of occurrences of the word in the transcript; determining respective scores for strings of the transcript based on the respective sentence vectors; selecting a string for highlighting from the transcript based on respective scores of strings; selecting a video excerpt from a video of the conference based on the respective timestamp of the selected string; and generating a video conference summary as a sequence of video excerpts from the video, including the selected video excerpt.

One aspect of this disclosure is a system that includes a processor, and a memory, wherein the memory stores instructions executable by the processor to: obtain a transcript of a conference, wherein the transcript includes strings with respective timestamps; determine respective sentence vectors for strings of the transcript, wherein a sentence vector has elements corresponding to words present in the transcript that are proportional to a number of occurrences of the word in the string and inversely proportional to a number of occurrences of the word in the transcript; determine respective scores for strings of the transcript based on the respective sentence vectors; select a string for highlighting from the transcript based on respective scores of strings; select a video excerpt from a video of the conference based on the respective timestamp of the selected string; and generate a video conference summary as a sequence of video excerpts from the video, including the selected video excerpt.

One aspect of this disclosure is a non-transitory computer-readable storage medium, comprising executable instructions that, when executed by a processor, facilitate performance of operations, including obtaining a transcript of a conference, wherein the transcript includes strings with respective timestamps; determining respective sentence vectors for strings of the transcript, wherein a sentence vector has elements corresponding to words present in the transcript that are proportional to a number of occurrences of the word in the string and inversely proportional to a number of occurrences of the word in the transcript; determining respective scores for strings of the transcript based on the respective sentence vectors; selecting a string for highlighting from the transcript based on respective scores of strings; selecting a video excerpt from a video of the conference based on the respective timestamp of the selected string; and generating a video conference summary as a sequence of video excerpts from the video, including the selected video excerpt.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 16 is an illustration of an example of a transcript of a conference.

FIG. 19 is an illustration of an example of speaker segments that have been identified in a transcript of a conference.

DETAILED DESCRIPTION

Figure 1:
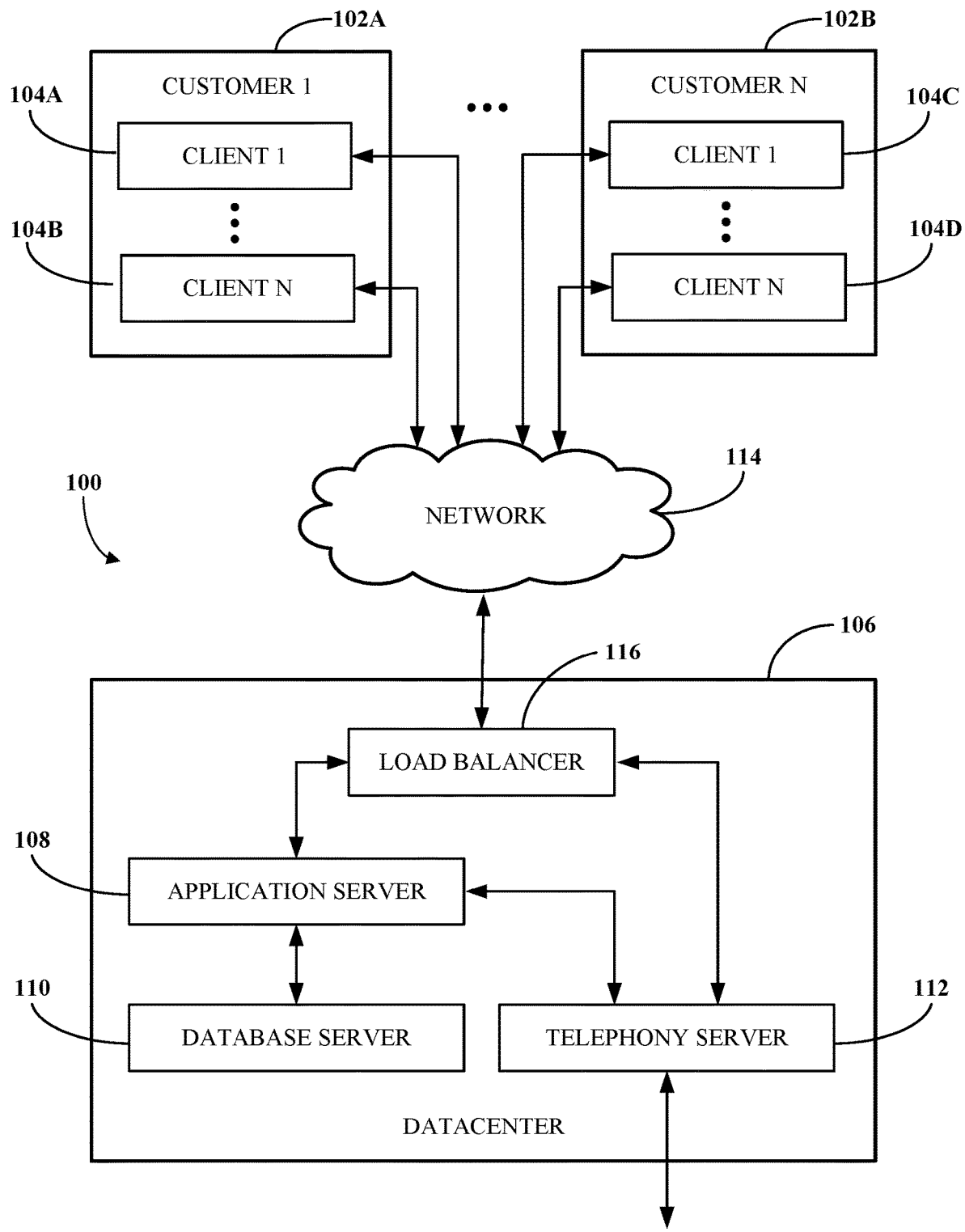
FIG. 1 is a block diagram of an example of an electronic computing and communications system.

An important aspect of electronic communications within and between enterprises occurs in conferences (e.g., video conferences, audio conferences, or telephone calls with two or more participants). In many sectors such as business or education, the content of conferences is largely captured in the speech that is recorded during the conference, which can be transcribed to text, and information can be extracted from the text. However, reviewing text can be tedious and reviewing long recordings of audio and/or video content can be time consuming.

Implementations of this disclosure address problems such as these by automatically extracting a summary from a conference recording transcript using natural language processing techniques. The summary may be presented to the user as highlighted text, and the user can optionally make modifications. The final highlighted transcript may be used to generate a brief text summary. The highlighted transcript timestamps are used to generate video clips from a video recording of the conference that may be used as video summary of the conference. As a result, a long conference may be condensed to a minutes-long video clip with a short text summary.

In some implementations, a transcript of a conference is processed with natural language processing (e.g., implemented using a machine learning model, such as neural network, or a text-rank algorithm using vector representation of the transcript text, such as term frequency-inverse document frequency analysis over the transcript) to determine content relevance scores for strings (e.g., sentences) in the transcript. The strings with the highest scores are selected as highlights. For example, word frequency based vectorization or semantics based vectorization methods may be utilized to convert text to numerical vectors. The system may also consider the duration of speaker segments (i.e., sections of uninterrupted speaking by one speaker) when selecting highlights to ensure the most relevant strings from the longest speaker segments are included as highlights. Once a set of strings is selected as the highlights a transcript that is so highlighted may be presented to a user who can edit the proposed highlighting to provide feedback. The proposed highlights and/or edited highlights may then be used to select audio clips and/or video clips from the conference recording based on timestamps associated with the highlights. The selected video clips may be assembled into a concise conference summary video or audio recording.

In some implementations, a role of the speaker (e.g., host or non-host) is considered when selecting highlights. In some implementations, keywords are detected, and the selection of highlights is based in part on keywords. In some implementations, a classifier predicts whether a sentence includes an action item, and the selection of highlights is based in part on the presence of action items.

The systems and techniques described herein may provide advantages, such as reducing memory, network bandwidth, or other system resources needed to disseminate information from a conference to users of a unified communications system, and/or reducing the user effort expended to access important information in a conference recording.

To describe some implementations in greater detail, reference is first made to examples of hardware and software structures used to implement automated recording highlights for conferences. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs the same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs the same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
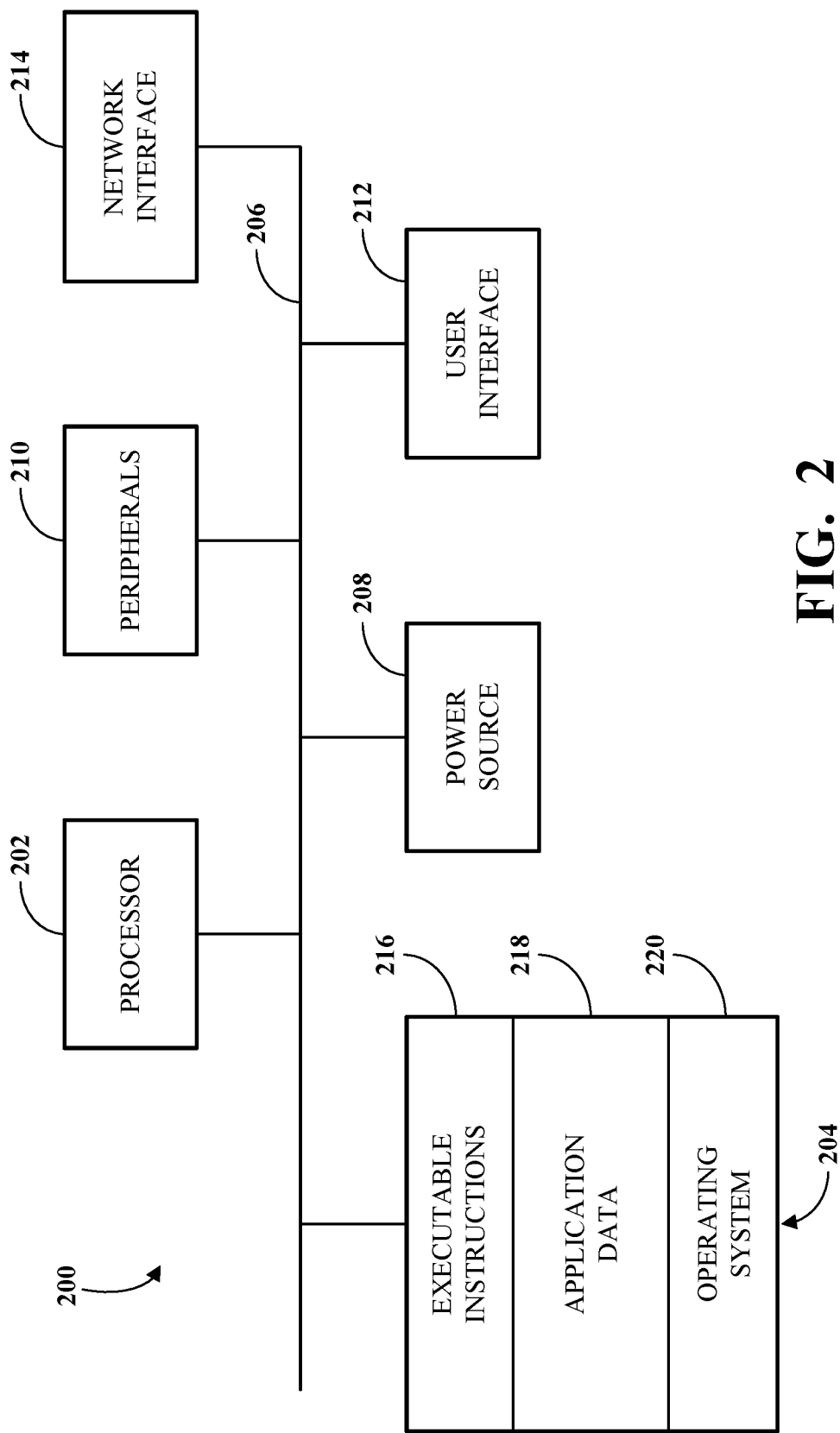
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
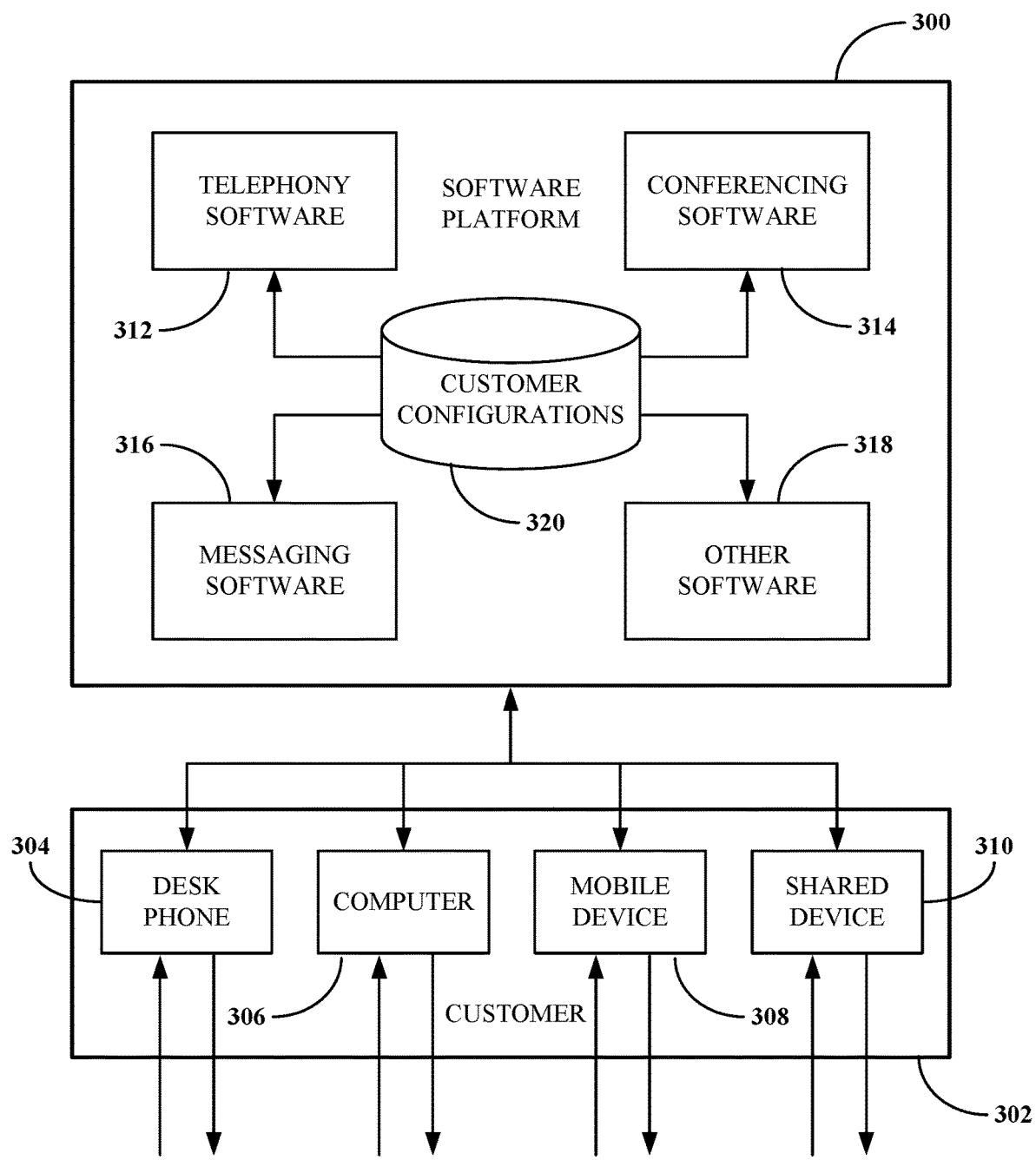
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for generating a summary of a recording of a conference based on automated highlighting of a transcript of the conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a conference server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
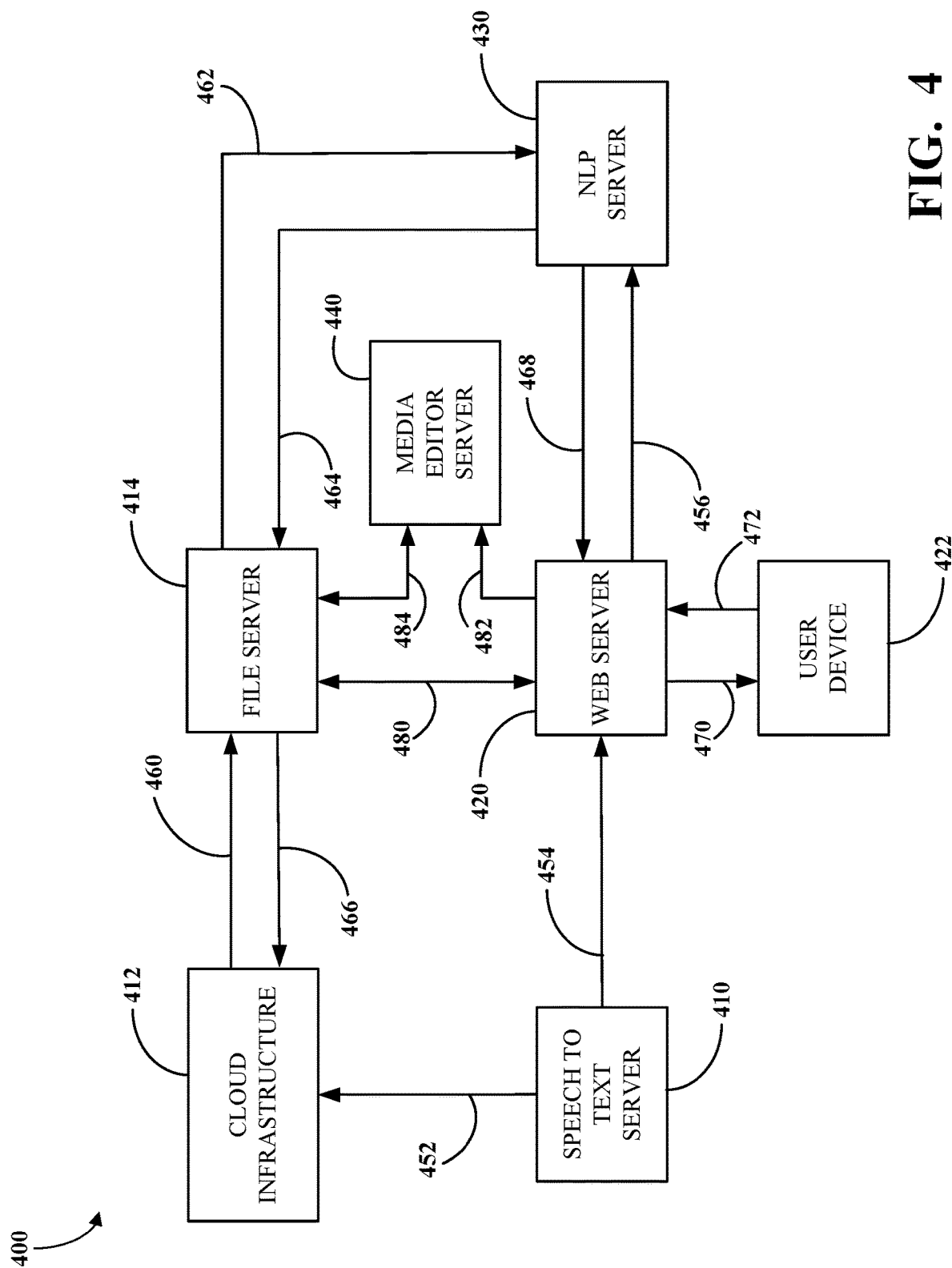
FIG. 4 is a block diagram of an example of a system for automated recording highlights for conferences.

FIG. 4 is a block diagram of an example of a system 400 for automated recording highlights for conferences. The system 400 includes a speech to text server 410; a cloud infrastructure 412; a file server 414; a web server 420; a user device 422; a natural language processing (NLP) server 430; and a media editor server 440. For example, the system 400 may be used to implement the technique 500 of FIG. 5. For example, the system 400 may be used to implement the technique 600 of FIG. 6. For example, the system 400 may be used to implement the technique 700 of FIG. 7. For example, the system 400 may be used to implement the technique 800 of FIG. 8. For example, the system 400 may be used to implement the technique 1100 of FIG. 11. For example, the system 400 may be used to implement the technique 1200 of FIG. 12. For example, the system 400 may be used to implement the technique 1300 of FIG. 13.

For example, the web server 420 may be the application server 108 of FIG. 1. The cloud infrastructure 412 may be a cloud computing infrastructure including many server devices that facilitate the on-demand execution scalable applications. For example, the cloud infrastructure 412 may include a cloud storage (e.g., AWS S3). In some implementations, the file server 414 may be implemented using the database server 110 in the datacenter 106. For example, the speech to text server 410, the NLP server 430, and the media editor server 440 may be implemented as components of the software platform 300. In some implementations, the NLP server 430 is implemented using Elastic Kubernetes Service (EKS) infrastructure. For example, the file server 414 may store and or control access to recordings of conferences and transcripts of conferences.

For example, the data flow through the system 400 may proceed as follows. First, an audio recording of a conference (e.g., a video conference, audio conference, or audio only call) may be transcribed to text using speech recognition software running on the speech to text server 410, and uploaded 452 to the cloud infrastructure 412 (e.g., AWS S3). Second, the speech to text server 410 sends 454 a notification to the web server 420 that the transcript is ready. Third, the web server 420 sends 456 a notification to the NLP server 430 (e.g., an AWS EKS cluster) to cause the NLP server 430 to generate a summary of the conference. Fourth, the NLP server 430 downloads 460 transcript text from the cloud infrastructure 412 (e.g., cloud storage AWS S3) via accessing 462 an application programming interface (API) of the file server 414. Fifth, the NLP server 430 extracts the summary from the transcript text, then uses 464 the API of the file server 414 to upload 466 the summary to the cloud infrastructure 412. Sixth, the NLP server 430 may notify 468 the web server 420 that the summary is ready. Seventh, the web server 420 may present 470 the transcript summary as highlighted text on a recording web page user interface (UI) and allow a user to use the user device 422 to modify 472 the highlighting that may be used to generate summary video clips of the conference. Eighth, the web server 420 may download 480 the highlighted transcript and video file from the cloud infrastructure 412 via the file server 414, when hosting the recording web page. Then the user modified transcript highlighting may be uploaded 480 to the cloud infrastructure 412 via the file server 414. Ninth, when a user device generates a video clip, the web server 420 sends 482 a request to the media editor server 440. For example, the request may contain a list of timestamps: [t1-start, t1-end; t2-start, t2-end; . . . tN-start, tN-end] identifying portions of an video or audio recording of the conference that are to be included in a video or audio summary of the conference. Tenth, the media editor server 440 downloads 484 the conference recording file from the cloud infrastructure 412 via the file server 414, and generates a video summary (e.g., a clip) based on the timestamp list, then the video summary may be uploaded 484 to the cloud infrastructure 412 via the file server 414.

Figure 5:
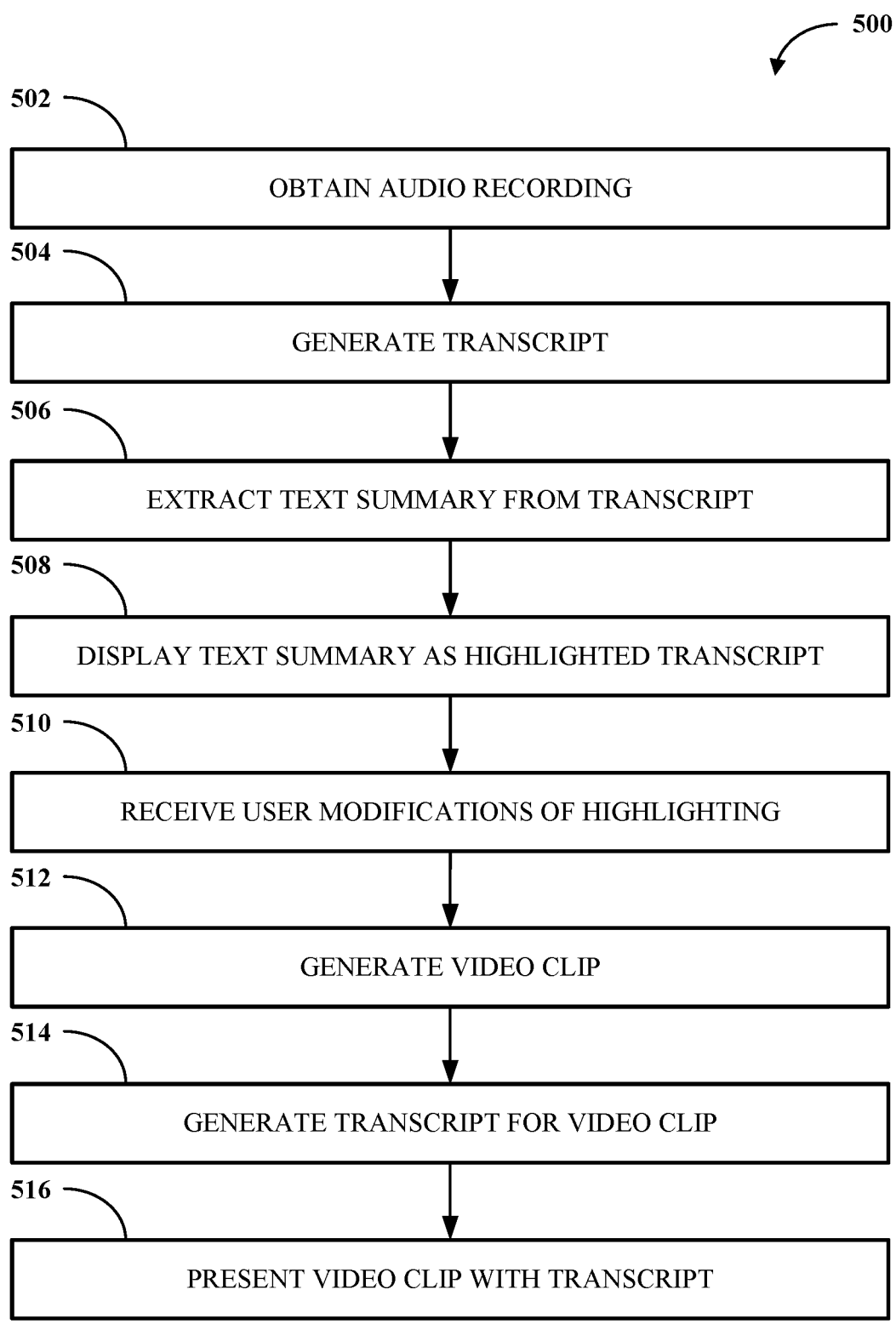
FIG. 5 is a flowchart of an example of a technique for generating a summary of a video recording of a conference based on automated highlighting of a transcript of the conference.
Figure 6:
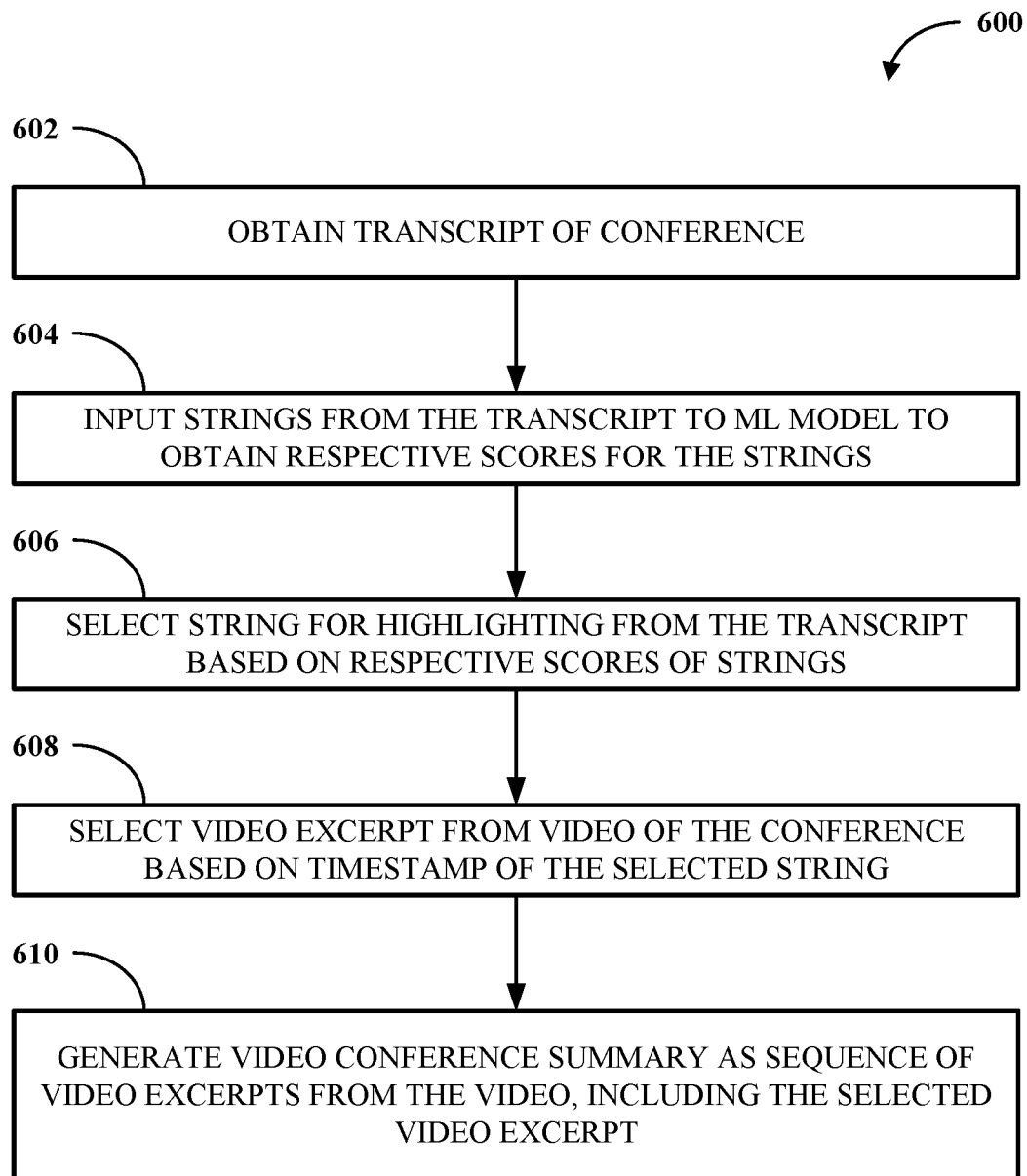
FIG. 6 is a flowchart of an example of a technique for generating a summary of a video recording of a conference based on highlighting of a transcript of the conference using a machine learning model.
Figure 7:
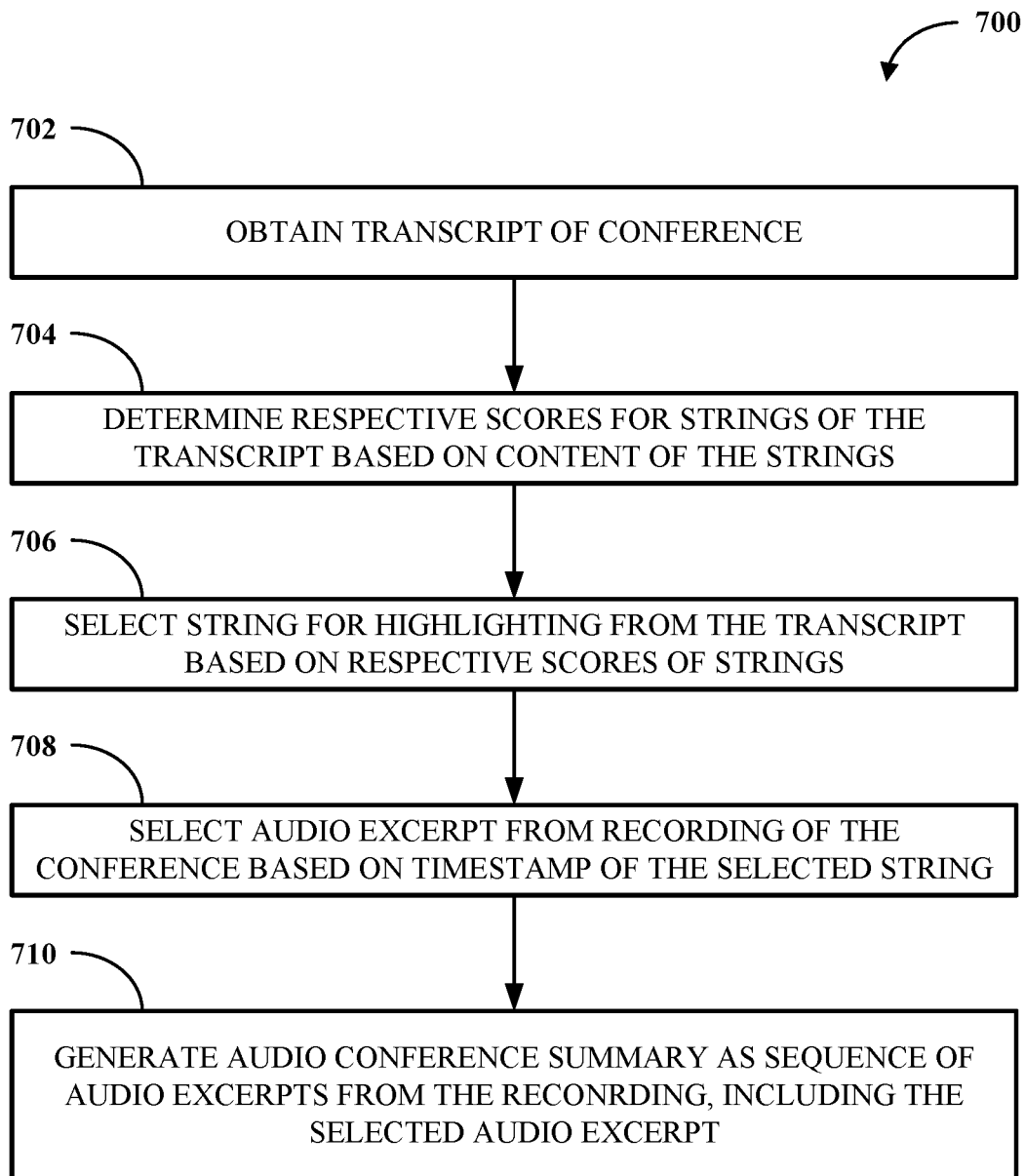
FIG. 7 is a flowchart of an example of a technique for generating a summary of an audio recording of a conference based on automated highlighting of a transcript of the conference.
Figure 8:
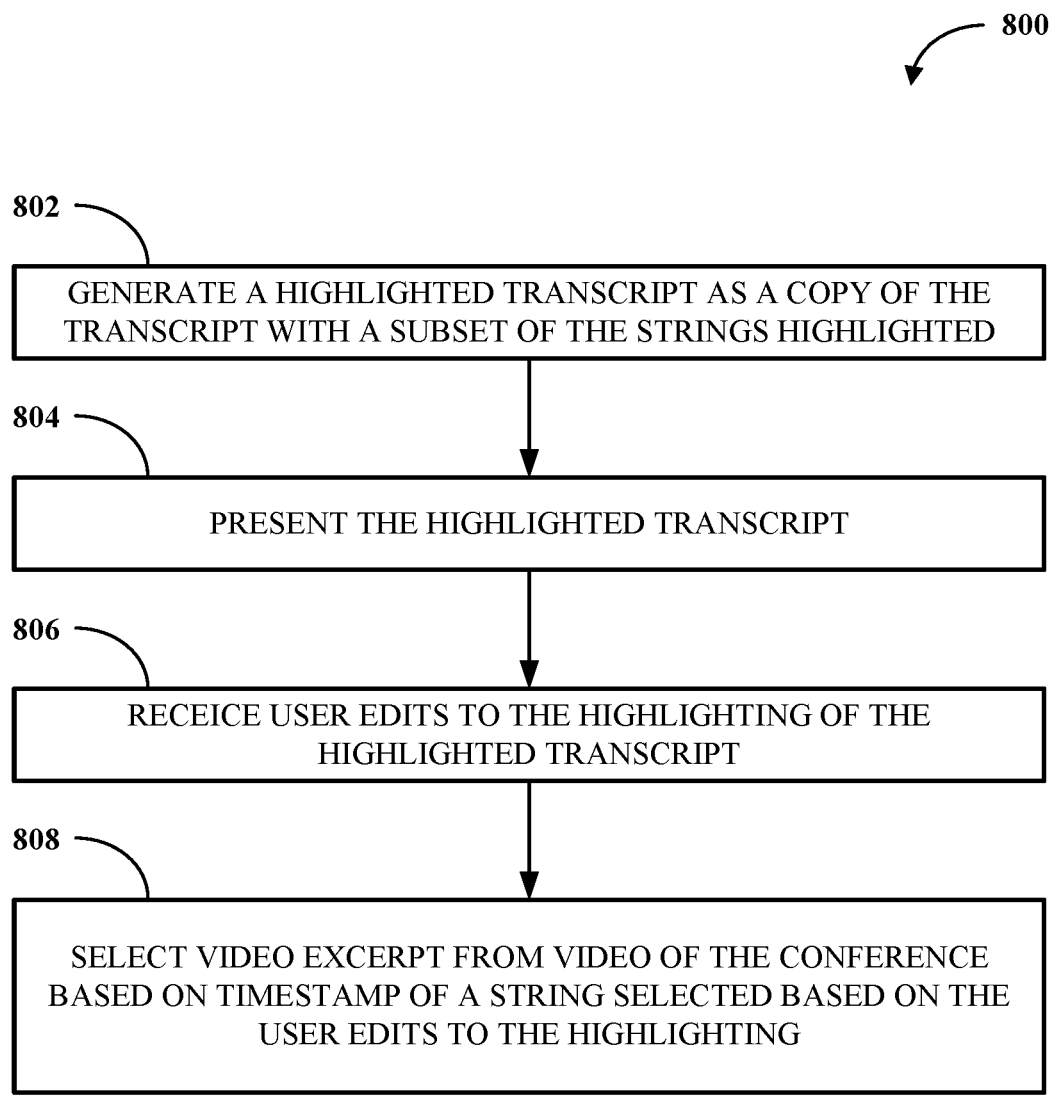
FIG. 8 is a flowchart of an example of a technique for presenting a highlighted transcript of a conference to collect user feedback in the form of user edits to highlighting that can be used to select video clips for a summary of a recording of the conference.
Figure 9:
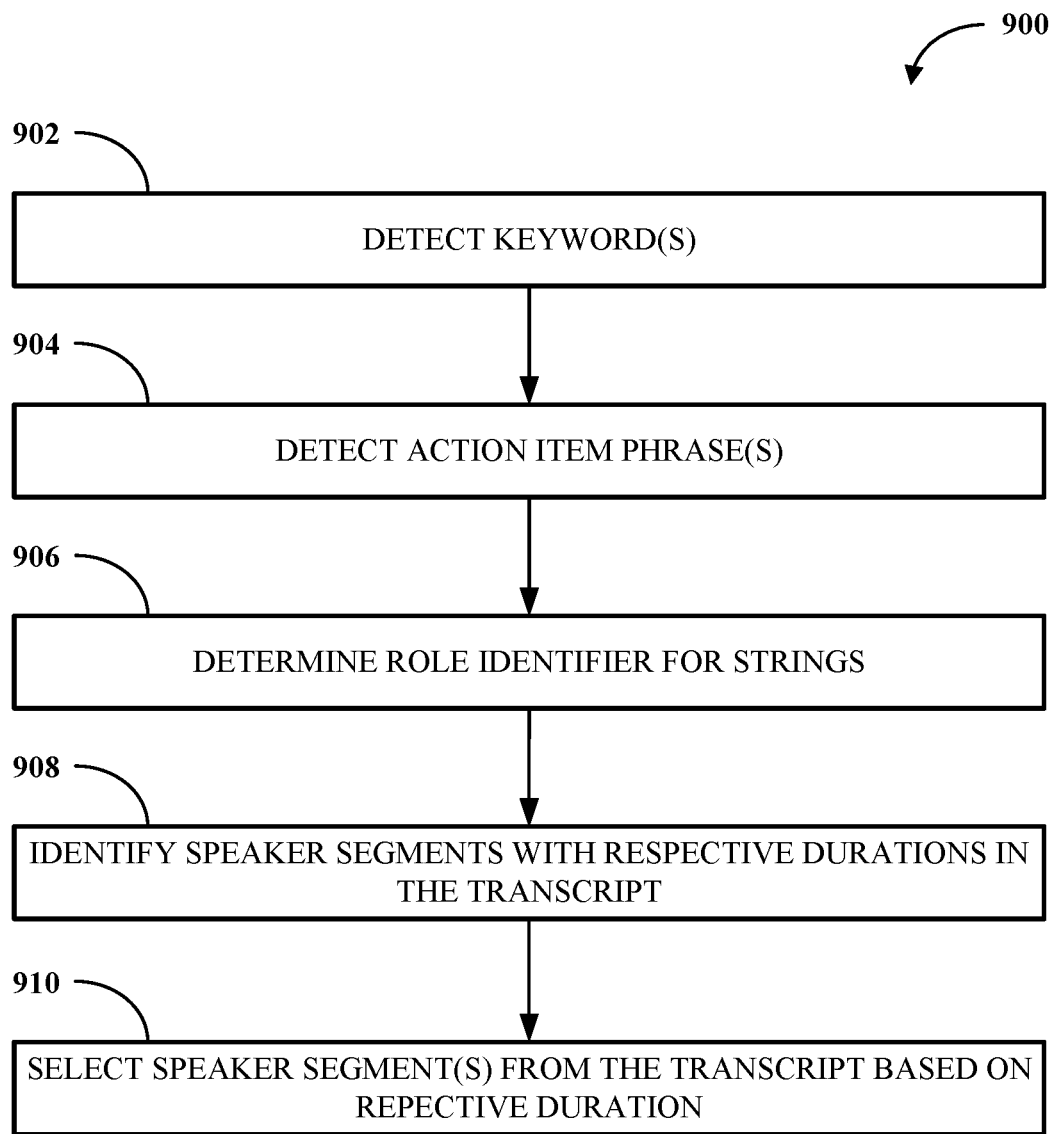
FIG. 9 is a flowchart of an example of a technique for automatically selecting a string from a transcript for highlighting.
Figure 10:
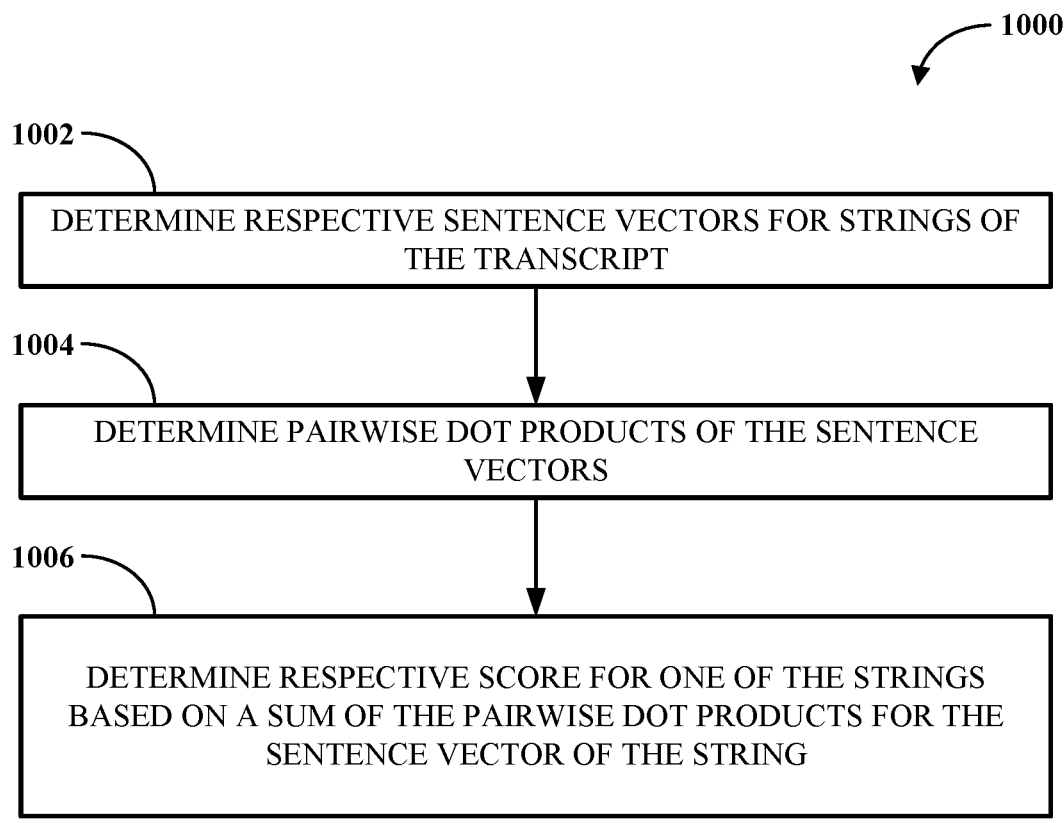
FIG. 10 is a flowchart of an example of a technique for determining respective scores for strings of a transcript based on content of the strings.
Figure 11:
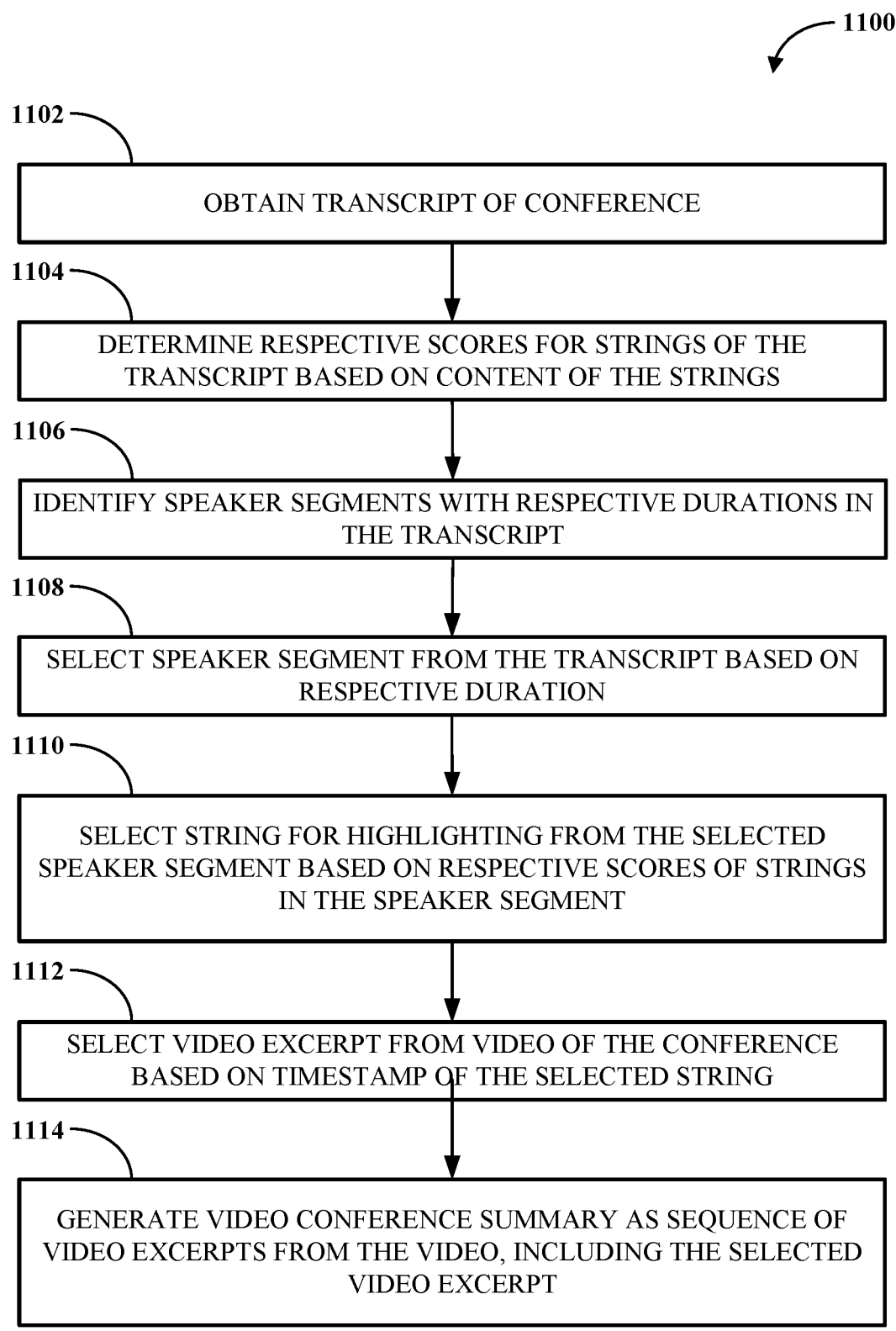
FIG. 11 is a flowchart of an example of a technique for generating a summary of a video recording of a conference based on highlighting of a transcript of the conference that is highlighted based on analysis of speaker segment durations.
Figure 12:
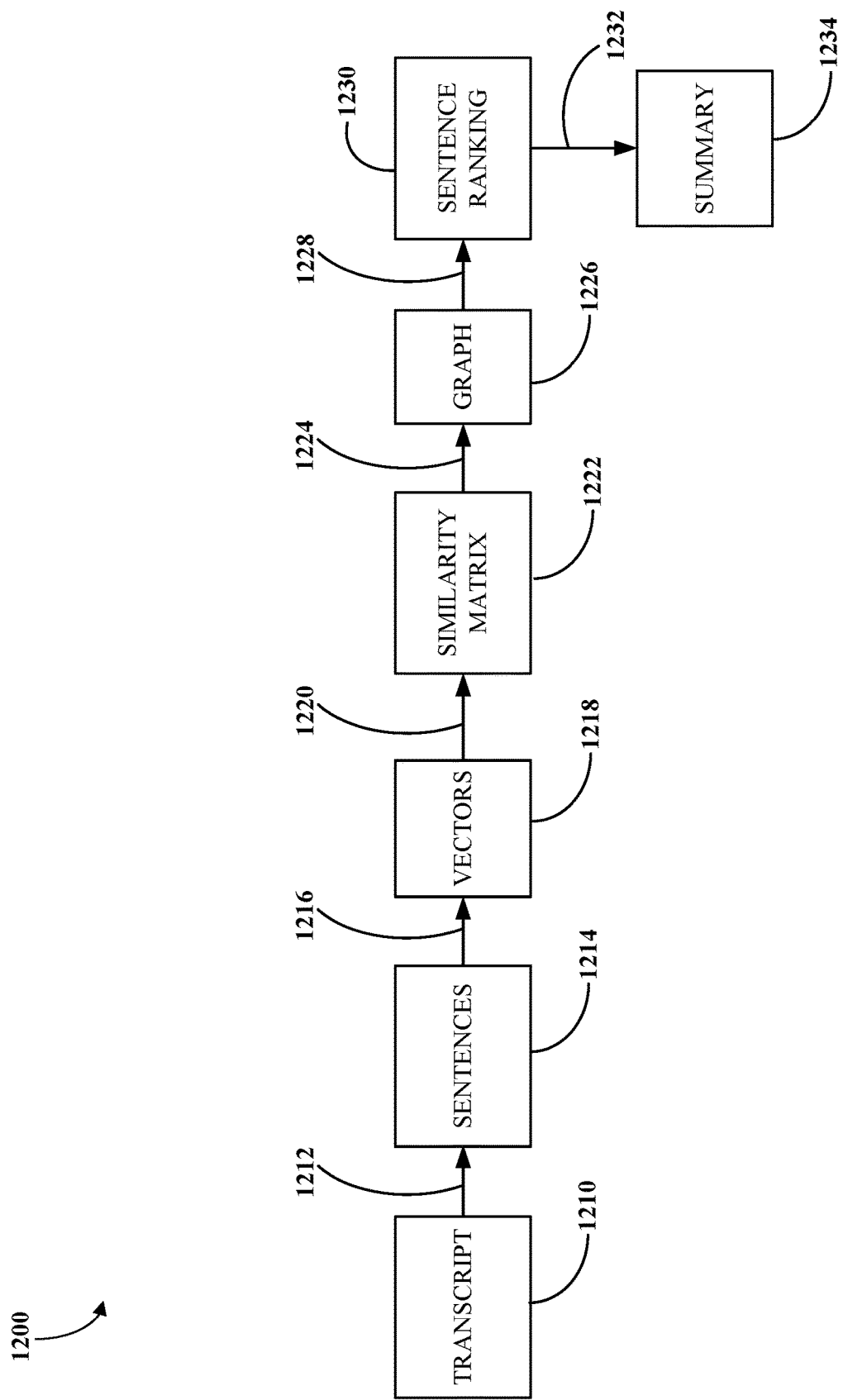
FIG. 12 is a flowchart of an example of a technique for determining respective scores for strings of a transcript based on content of the strings.
Figure 13:
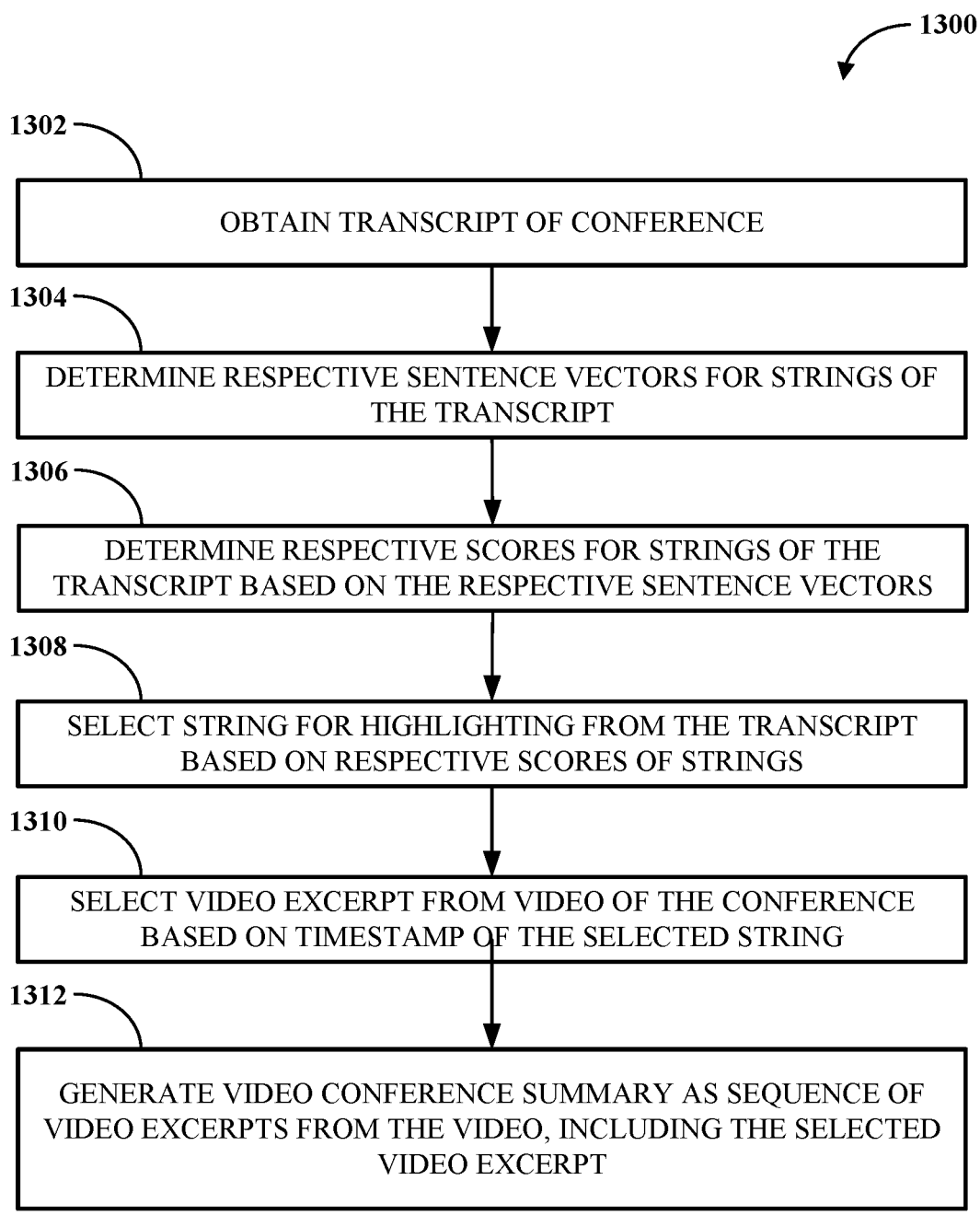
FIG. 13 is a flowchart of an example of a technique for generating a summary of a video recording of a conference based on highlighting of a transcript of the conference, which is determined based on comparison of sentence vectors for strings of the transcript.
Figure 14:
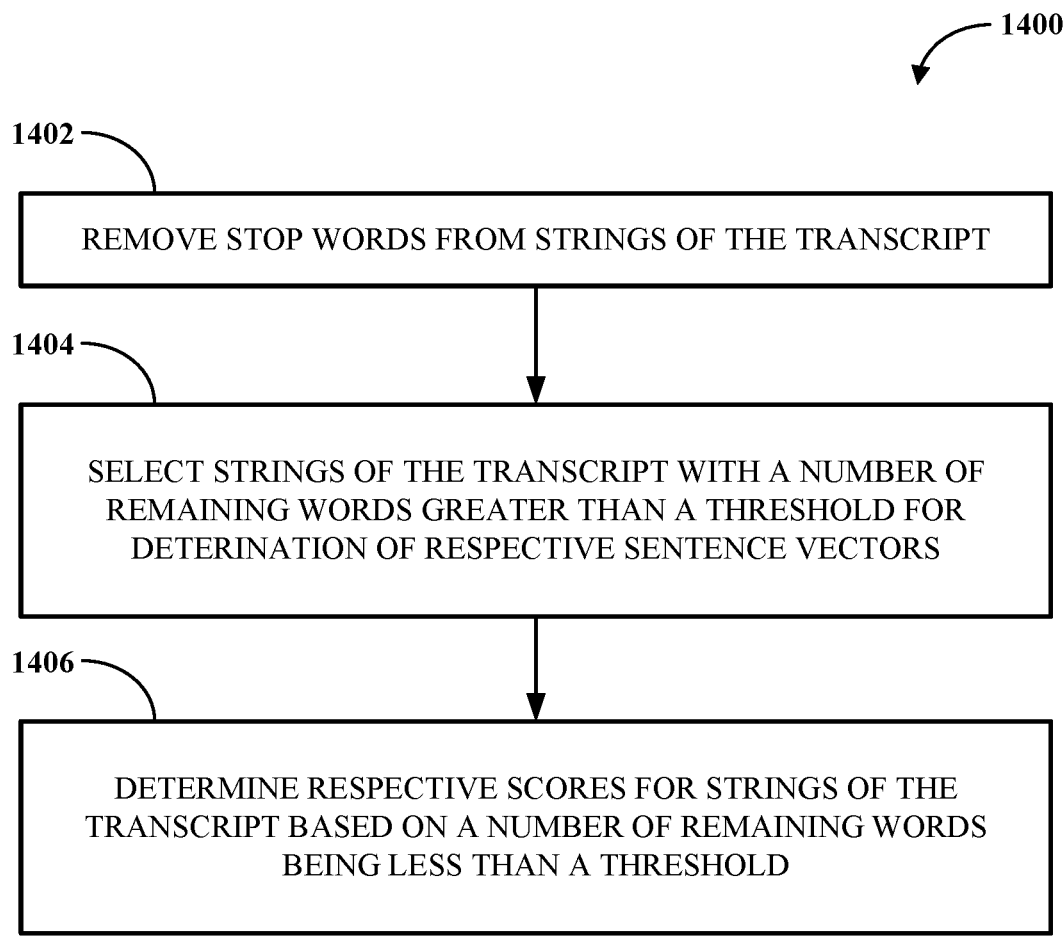
FIG. 14 is a flowchart of an example of a technique for determining respective sentence vectors for strings of a transcript.
Figure 15:
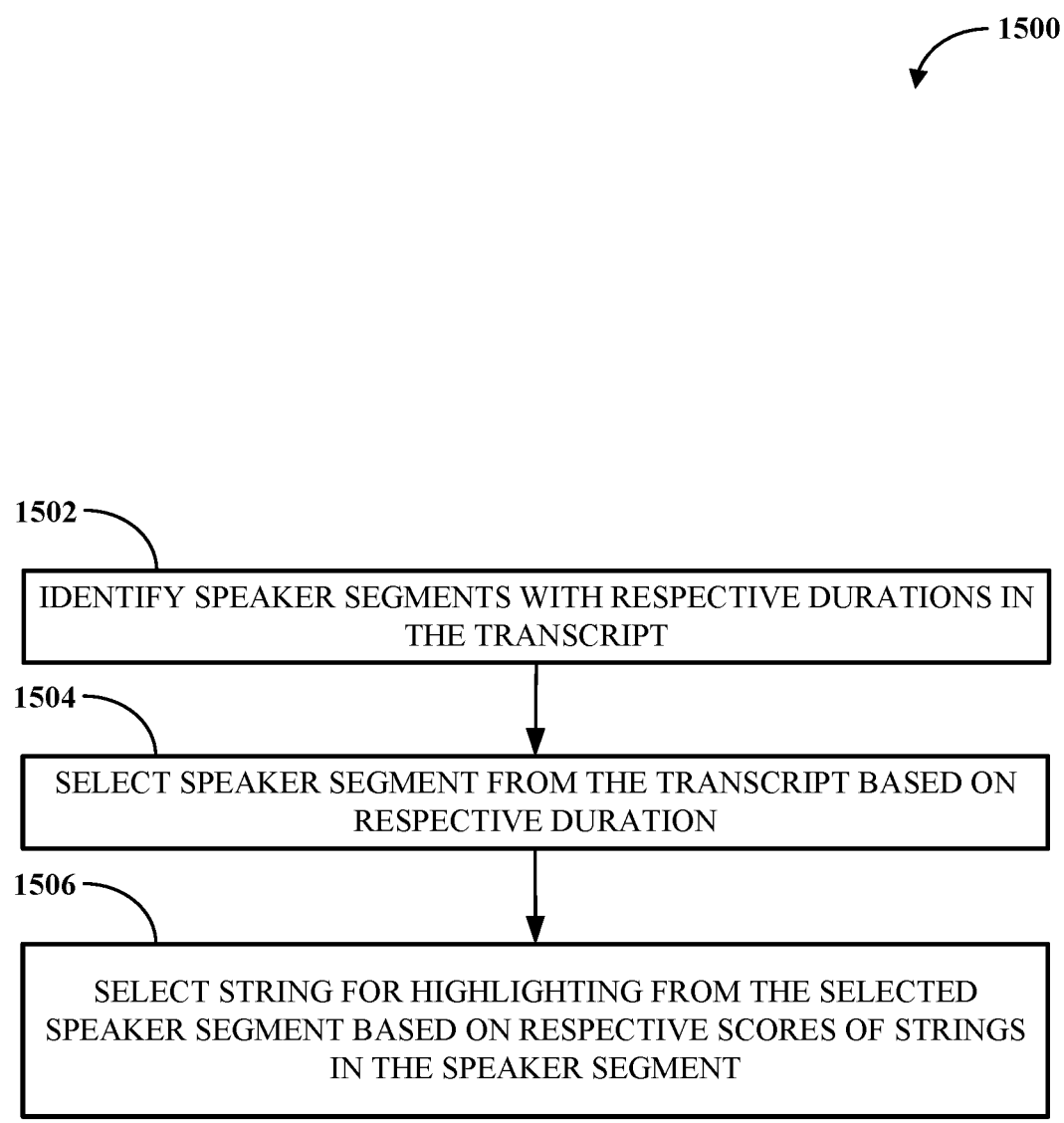
FIG. 15 is a flowchart of an example of a technique for selecting strings of a transcript for highlighting based on analysis of speaker segment durations.

To further describe implementations in greater detail, reference is next made to examples of techniques which may be performed to obtain or use automated recording highlights for conferences. FIG. 5 is a flowchart of an example of a technique 500 for generating a summary of a video recording of a conference based on automated highlighting of a transcript of the conference. FIG. 6 is a flowchart of an example of a technique 600 for generating a summary of a video recording of a conference based on highlighting of a transcript of the conference using a machine learning model. FIG. 7 is a flowchart of an example of a technique 700 for generating a summary of an audio recording of a conference based on automated highlighting of a transcript of the conference. FIG. 8 is a flowchart of an example of a technique 800 for presenting a highlighted transcript of a conference to collect user feedback in the form of user edits to highlighting that can be used to select video clips for a summary of a recording of the conference. FIG. 9 is a flowchart of an example of a technique 900 for automatically selecting a string from a transcript for highlighting. FIG. 10 is a flowchart of an example of a technique 1000 for determining respective scores for strings of a transcript based on content of the strings. FIG. 11 is a flowchart of an example of a technique 1100 for generating a summary of a video recording of a conference based on highlighting of a transcript of the conference that is highlighted based on analysis of speaker segment durations. FIG. 12 is a flowchart of an example of a technique 1200 for determining respective scores for strings of a transcript based on content of the strings. FIG. 13 is a flowchart of an example of a technique 1300 for generating a summary of a video recording of a conference based on highlighting of a transcript of the conference, which is determined based on comparison of sentence vectors for strings of the transcript. FIG. 14 is a flowchart of an example of a technique 1400 for determining respective sentence vectors for strings of a transcript. FIG. 15 is a flowchart of an example of a technique 1500 for selecting strings of a transcript for highlighting based on analysis of speaker segment durations.

The techniques 500, 600, 700, 800, 900, 1000, 1100, 1200, 1300, 1400, and/or 1500 can be executed using computing devices, such as the systems, hardware, and software described with respect to FIGS. 1-4. The techniques 500, 600, 700, 800, 900, 1000, 1100, 1200, 1300, 1400, and/or 1500 can be performed, for example, by executing a machine-readable program or other computer-executable instructions, such as routines, instructions, programs, or other code. The steps, or operations, of the techniques 500, 600, 700, 800, 900, 1000, 1100, 1200, 1300, 1400, and/or 1500 or another technique, method, process, or algorithm described in connection with the implementations disclosed herein can be implemented directly in hardware, firmware, software executed by hardware, circuitry, or a combination thereof.

For simplicity of explanation, each of the techniques 500, 600, 700, 800, 900, 1000, 1100, 1200, 1300, 1400, and 1500 are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring to FIG. 5, the technique 500 for generating a summary of a video recording of a conference based on automated highlighting of a transcript of the conference is shown. At 502, the technique 500 includes obtaining an audio recording of the conference. For example, the conference may be a video conference between two or more participants. In some implementations, the audio recording may include one or more audio channels from a video recording of the conference. For example, the conference may be a telephone call between two or more participants. In some implementations, the audio recording may include one or more audio channels from an audio-only recording of the conference. The audio recording may be received in a variety of formats. For example, the audio recording may be received as an audio file from a server (e.g., the file server 414. For example, the audio recording may be received as a sequence of packets or frames bearing audio signals of an incoming phone call that are encoded in accordance with a compression standard (e.g., ITU-T G.711, G.723 or G.729) from a telephony device or system that is being used to complete an audio call or a video conference. For example, the audio recording may be received using a network interface (e.g., the network interface 214). For example, the audio recording may be received from a memory (e.g. the memory 204) via a bus (e.g., the bus 206).

At 504, the technique 500 includes generating a transcript of the conference based on the audio recording. For example, the audio recording may be transcribed to text using automatic speech recognition (ASR) software. For example, the speech recognition model used to generate the transcript may be based on hidden Markov models, dynamic time warping, and/or neural networks. For example, the resulting transcript may be encoded as a file (e.g., a text file) that includes timestamps associated with strings. In some implementations, the strings of the transcript are also associated with a respective speaker who participated in the conference. A string may include one or more words delimited by special characters (e.g., spaces and/or punctuation marks). For example, strings of the transcript may have respective timestamps corresponding to a time in the audio recording at the start of the speaking of the words encoded in the string. For example, strings of the transcript may have respective timestamps corresponding to a time in the audio recording at the end of the speaking of the words encoded in the string. In some implementations, each string encodes a sentence that was spoken during the audio recording of the conference.

At 506, the technique 500 includes extracting a text summary from the transcript using a natural language processing technique (e.g., using a machine learning model). The text summary may be a subset of the set of strings in the transcript that are considered most significant. The text summary may provide a condensed version of the transcript of the conference. For example, the text summary may be a set of pointers or identifiers for strings of the transcript that have been identified as most relevant. For example, respective scores may be determined for strings of the transcript that reflect relevance of the strings, and these scores may be used to rank and select strings of the transcript for inclusion in the text summary. In some implementations, a machine learning model (e.g., a PreSumm model) is trained and used to determine respective scores for strings of the transcript. For example, the machine learning model 2300 of FIG. 23 may be used to extract a text summary from the transcript. In some implementations, strings of the transcript are converted to sentence vectors and pairwise similarity metrics for the sentence vectors are used to determine respective scores for strings of the transcript. For example, the technique 1000 of FIG. 10 may be implemented to determine respective scores for strings of a transcript based on content of the strings.

At 508, the technique 500 includes displaying the text summary of the transcript as a highlighted transcript. For example, the highlighted transcript may be presented in a webpage of a conference recording website (e.g., hosted by the web server 420). For example, the highlighted transcript may be presented by transmission to a user device (e.g., the mobile device 308) for display in a client application. At 510, the technique 500 includes receiving user modifications of the highlighting for the transcript. In some implementations, a user may choose to modify the transcript highlights (e.g., extend, contract, add, or remove highlights), or leave the auto generated highlights of the text summary alone. For example, the technique 800 of FIG. 8 may be implemented to present the highlighted transcript to a user and receive user modifications of the highlighting that can be used to update the text summary of the transcript.

At 512, the technique 500 includes generating a video clip based on transcript timestamps corresponding to the highlighted strings. One or more conference highlight video clips may serve as a video summary of the conference. For example, the video clip may include a portion of a video recording of the conference that starts at a respective start timestamp for a highlighted string of the transcript and ends at a respective end timestamp for a highlighted string of the transcript. For example, the video clip may be generated by the media editor server 440 responsive to a request message from the web server 420.

At 514, the technique 500 includes generating a transcript for the video clip. For example, the transcript of the video clip may be generated again from one or more audio channels of the video clip using ASR software.

At 516, the technique 500 includes presenting the video clip and the transcript of the video clip to a user. For example, the video clip and transcript may be downloaded as a video and text summary of the conference by a user (e.g., using the user device 422 to download from the web server 420). For example, the video clip and the transcript of the video clip may be presented to a user by transmitting the video clip and the transcript to a user device using a network interface (e.g., the network interface 214). In some implementations, the steps 510, 512, 514, and 516 may be repeated to generate many different video clips that highlight different portions of the conference. The video clips can be downloaded and shared with different users.

Referring to FIG. 6, the technique 600 for generating a summary of a video recording of a conference based on highlighting of a transcript of the conference using a machine learning model is shown. At 602, the technique 600 includes obtaining a transcript of a conference (e.g., a video conference with two or more participants). The transcript includes strings with respective timestamps. For example, the transcript may be encoded as a file (e.g., a text file) that includes timestamps associated with strings. A string may include one or more words delimited by special characters (e.g., spaces and/or punctuation marks). In some implementations, each string encodes a sentence that was spoken during the audio recording of the conference. For example, strings of the transcript may be associated with respective start timestamps, with respective end timestamps, or with both. In some implementations, the transcript may also include additional metadata associated with respective strings. For example, a string of the transcript may be associated with a speaker identifier, which in turn may be associated with role information for a speaker (e.g., host or non-host participant of the conference). For example, the transcript may be generated from an audio recording of the conference using ASR software (e.g., as described in relation to step 504 of the technique 500). For example, the transcript may be retrieved from remote storage (e.g., from the cloud infrastructure 412 via the file server 414) or from local storage. For example, the transcript may be received using a network interface (e.g., the network interface 214). For example, the transcript may be received from a memory (e.g. the memory 204) via a bus (e.g., the bus 206).

At 604, the technique 600 includes inputting strings from the transcript to a machine learning model to obtain respective scores for the strings. The machine learning model may be trained using supervised learning technique or unsupervised learning. For example, the machine learning model may be trained to assign scores to strings based on feedback collected from users regarding the relevance of strings in the form of edits to highlighting of a transcript collected using the technique 800 of FIG. 8. For example, a string may be converted to a sequence of tokens (e.g., words and special tokens indicating the end of sentence) that are input to the machine learning model. In some implementations, multiple strings may be concatenated as a sequence of tokens and input in parallel to the machine learning model. For example, a special token may be used to pad a sequence of tokens for input out to an input width of the machine learning model. The output of the machine learning model may be one or more respective scores for strings of the transcript that have been input. For example, the machine learning model may include a neural network. For example, the machine learning model may include a deep neural network. For example, the machine learning model may include a PreSumm model. In some implementations, an embedding layer of a PreSumm model is a summation of four kinds of embeddings for each token: token embedding, position embedding, segment embedding, and speaker role embedding. The speaker role embedding may depend on speaker role data associated with a speaker identifier, which in turn is associated with the string in which the word for the token occurred. For example, the machine learning model 2300 of FIG. 23 may be used to obtain respective scores for the strings.

At 606, the technique 600 includes selecting a string for highlighting from the transcript based on respective scores of strings. For example, a fixed number of strings from the transcript with the highest respective scores may be selected. For example, a fixed percentage of the strings from the transcript with the highest respective scores may be selected. In some implementations, the strings of the transcript have respective speaker identifiers, the transcript is analyzed to identify speaker segments of various durations, speaker segments are selected based on their durations, and one or more strings are selected from amongst the strings of a selected speaker segment based on the respective scores of the strings. For example, the technique 1500 of FIG. 15 may be implemented to select one or more strings for highlighting. In some implementations, the respective speaker identifier for the selected string is associated with a role identifier, and the technique 600 may include selecting a string for highlighting from the transcript based on the role identifier. Other information regarding the strings may be used to select strings for highlighting, such as, detecting one or more words from a set of keywords in a string and/or detecting an action item phrase in a string. For example, the technique 900 of FIG. 9 may be implemented to select one or more strings for highlighting. In some implementations, a smoothing effect may be applied to a selection of highlighted strings. For example, if the time span between two highlighted strings of the transcript is smaller than a configurable time (e.g., 5 seconds), then the technique 600 may automatically highlight one or more strings occurring between the two highlighted strings of the transcript. For example, technique 600 may include, responsive to a time span between two highlighted strings of the transcript being smaller than a threshold (e.g., 5 seconds), selecting one or more strings occurring between the two highlighted strings for highlighting. This smoothing of the selection of highlighted strings may serve to make a corresponding video summary more connected. For example, for automatically highlighted strings (e.g., chosen using a text-rank algorithm or a machine learning model), if a time span between an unhighlighted string occurring consecutively before or after a highlighted string is less than a configurable time (e.g., 3 seconds), then the technique 600 may automatically highlight the unhighlighted string prior or post to the highlighted segment chosen by text rank. For example, technique 600 may include, responsive to a time span between an unhighlighted string and a highlighted string of the transcript being smaller than a threshold (e.g., 3 seconds), selecting the unhighlighted string for highlighting. For example, a time span between two strings may be determined as a difference between a respective start timestamp of the later string and a respective end timestamp of the earlier string in the transcript.

At 608, the technique 600 includes selecting a video excerpt (e.g., a video clip) from a video of the conference based on the respective timestamp of the selected string. The video excerpt may be selected based on one or more transcript timestamps corresponding to a selected string. For example, the video excerpt may include a portion of a video recording of the conference that starts at a respective start timestamp for the selected string of the transcript and ends at a respective end timestamp for the selected string of the transcript.

In some implementations the selected strings are presented to a user in a highlighted transcript and user edits to the highlighting are received and used to adjust which strings are selected for inclusion in a video summary of the conference. For example, the technique 800 of FIG. 8 may be implemented to modify the selection of strings for inclusion in a video summary of the conference.

At 610, the technique 600 includes generating a video conference summary as a sequence of video excerpts from the video, including the selected video excerpt. For example, the video conference summary may be generated by the media editor server 440 responsive to a request message from the web server 420. The video conference summary may be presented to a user. For example, the video conference summary may be downloaded by a user (e.g., using the user device 422 to download from the web server 420). For example, the video conference summary may be presented to a user by transmitting the video conference summary to a user device using a network interface (e.g., the network interface 214).

Referring to FIG. 7, the technique 700 for generating a summary of an audio recording of a conference based on automated highlighting of a transcript of the conference is shown. At 702, the technique 700 includes obtaining a transcript of a conference (e.g., a video conference, an audio conference, or a telephone call with two or more participants). The transcript includes strings with respective timestamps. For example, the transcript may be encoded as a file (e.g., a text file) that includes timestamps associated with strings. A string may include one or more words delimited by special characters (e.g., spaces and/or punctuation marks). In some implementations, each string encodes a sentence that was spoken during the audio recording of the conference. For example, strings of the transcript may be associated with respective start timestamps, with respective end timestamps, or with both. In some implementations, the transcript may also include additional metadata associated with respective strings. For example, a string of the transcript may be associated with a speaker identifier, which in turn may be associated with role information for a speaker (e.g., host or non-host participant of the conference). For example, the transcript may be generated from an audio recording of the conference using ASR software (e.g., as described in relation to step 504 of the technique 500). For example, the transcript may be retrieved from remote storage (e.g., from the cloud infrastructure 412 via the file server 414) or from local storage. For example, the transcript may be received using a network interface (e.g., the network interface 214). For example, the transcript may be received from a memory (e.g. the memory 204) via a bus (e.g., the bus 206).

At 704, the technique 700 includes determining respective scores for strings of the transcript based on content of the strings. For example, the respective scores may be determined using a natural language processing (NLP) technique (e.g., using a machine learning model). The respective scores may be indicative of an importance or relevance of the strings in the context of the transcript of the conference. For example, the respective scores may be used to rank and select strings of the transcript for inclusion in a summary of the conference. For example, determining respective scores for strings of the transcript may include inputting the strings from the transcript to a machine learning model to obtain the respective scores for the strings. In some implementations, a machine learning model (e.g., a PreSumm model) is trained to determine respective scores for strings of the transcript. For example, the machine learning model 2300 of FIG. 23 may be used to determine respective scores for strings of the transcript. In some implementations, strings of the transcript are converted to sentence vectors and pairwise similarity metrics for the sentence vectors are used to determine respective scores for strings of the transcript. For example, a text ranking algorithm may be used to select the sentences that have the highest similarity with all other sentences. For example, the technique 1000 of FIG. 10 may be implemented to determine respective scores for strings of a transcript based on content of the strings.

At 706, the technique 700 includes selecting a string for highlighting from the transcript based on respective scores of strings. For example, a fixed number of strings from the transcript with the highest respective scores may be selected. For example, a fixed percentage of the strings from the transcript with the highest respective scores may be selected. In some implementations, the strings of the transcript have respective speaker identifiers, the transcript is analyzed to identify speaker segments of various durations, speaker segments are selected based on their durations, and one or more strings are selected from amongst the strings of a selected speaker segment based on the respective scores of the strings. For example, the technique 1500 of FIG. 15 may be implemented to select one or more strings for highlighting. In some implementations, the respective speaker identifier for the selected string is associated with a role identifier, and the technique 700 may include selecting a string for highlighting from the transcript based on the role identifier. Other information regarding the strings may be used to select strings for highlighting, such as, detecting one or more words from a set of keywords in a string and/or detecting an action item phrase in a string. For example, the technique 900 of FIG. 9 may be implemented to select one or more strings for highlighting. In some implementations, a smoothing effect may be applied to a selection of highlighted strings. For example, if the time span between two highlighted strings of the transcript is smaller than a configurable time (e.g., 5 seconds), then the technique 700 may automatically highlight one or more strings occurring between the two highlighted strings of the transcript. For example, technique 700 may include, responsive to a time span between two highlighted strings of the transcript being smaller than a threshold (e.g., 5 seconds), selecting one or more strings occurring between the two highlighted strings for highlighting. This smoothing of the selection of highlighted strings may serve to make a corresponding audio summary more connected. For example, for automatically highlighted strings (e.g., chosen using a text-rank algorithm or a machine learning model), if a time span between an unhighlighted string occurring consecutively before or after a highlighted string is less than a configurable time (e.g., 3 seconds), then the technique 7 may automatically highlight the unhighlighted string prior or post to the highlighted segment chosen by text rank. For example, technique 700 may include, responsive to a time span between an unhighlighted string and a highlighted string of the transcript being smaller than a threshold (e.g., 3 seconds), selecting the unhighlighted string for highlighting. For example, a time span between two strings may be determined as a difference between a respective start timestamp of the later string and a respective end timestamp of the earlier string in the transcript.

At 708, the technique 700 includes selecting an audio excerpt from a recording (e.g., an audio track of a video recording or an audio recording of an audio-only telephone call) of the conference based on the respective timestamp of the selected string. The audio excerpt may be selected based on one or more transcript timestamps corresponding to a selected string. For example, the audio excerpt may include a portion of an audio recording of the conference that starts at a respective start timestamp for the selected string of the transcript and ends at a respective end timestamp for the selected string of the transcript.

In some implementations the selected strings are presented to a user in a highlighted transcript and user edits to the highlighting are received and used to adjust which strings are selected for inclusion in an audio summary of the conference. For example, the technique 800 of FIG. 8 may be implemented to modify the selection of strings for inclusion in an audio summary of the conference.

At 710, the technique 700 includes generating an audio conference summary as a sequence of audio excerpts from the recording, including the selected audio excerpt. For example, the audio conference summary may be generated by the media editor server 440 responsive to a request message from the web server 420. The audio conference summary may be presented to a user. For example, the audio conference summary may be downloaded by a user (e.g., using the user device 422 to download from the web server 420). For example, the audio conference summary may be presented to a user by transmitting the audio conference summary to a user device using a network interface (e.g., the network interface 214).

Referring to FIG. 8, the technique 800 for presenting a highlighted transcript of a conference to collect user feedback in the form of user edits to highlighting that can be used to select video clips for a summary of a recording of the conference is shown. At 802, the technique 800 includes generating a highlighted transcript as a copy of the transcript with a subset of the strings highlighted. A selected string is highlighted. For example, the selected string may have been selected as important or relevant using techniques described in relation to FIG. 5, 6, 7, 11, or 13. For example, the highlighted transcript may be displayed as a copy of the transcript with the selected strings color coded with a different color (e.g., yellow or red) than the strings of the transcript that have not been selected. Other visual indications may be used to indicate which strings in the transcript have been selected.

At 804, the technique 800 includes presenting the highlighted transcript to a user. For example, the highlighted transcript may be downloaded by a user (e.g., using the user device 422 to download from the web server 420). For example, the highlighted transcript may be presented to a user by transmitting an encoding of the highlighted transcript to a user device using a network interface (e.g., the network interface 214).

At 806, the technique 800 includes receiving user edits to the highlighting of the highlighted transcript. For example, user edits to the highlighting of the highlighted transcript may extend, contract, add, or remove highlights, or approve the auto-generated highlighting unchanged. For example, the user may choose to highlight all strings by speaker(s), or strings that include trigger keywords or key phrases. For example, user edits may be received locally via a user interface (e.g., the user interface 212). For example, user edits may be received remotely via a communications interface (e.g., the network interface 214).

At 808, the technique 800 includes selecting an audio excerpt from the recording of the conference based on the respective timestamp of a string selected based on the user edits to the highlighting. The audio excerpt may be selected based on one or more transcript timestamps corresponding to a selected string. For example, the audio excerpt may include a portion of an audio recording of the conference that starts at a respective start timestamp for the selected string of the transcript and ends at a respective end timestamp for the selected string of the transcript. In some implementations, the audio excerpt is part of a video excerpt (e.g., one or more audio tracks of a video excerpt).

Referring to FIG. 9, the technique 900 for automatically selecting a string from a transcript for highlighting is shown. At 902, the technique 900 includes detecting one or more words from a set of keywords in a string from the transcript. A selected string may be selected based on presence of the one or more words from the set of keywords. For example, detecting keywords may include searching strings of the transcript for words from the set of keywords.

At 904, the technique 900 includes detecting an action item phrase in a string from the transcript. A selected string may be selected based on presence of the action item phrase.

For example, detecting an action item phrase in a string from the transcript may include inputting the strings from the transcript to a machine learning classifier that has been trained to output predictions of whether a string includes an action item phrase.

At 906, the technique 900 includes determining a role identifier for a string of the transcript. For example, the strings of the transcript may have respective speaker identifiers and the respective speaker identifier for the selected string may be associated with a role identifier. For example, this associated role identifier may provide an indication of whether the speaker of the string is a host or a non-host participant in the conference. A string may be selected for highlighting from the transcript based on the role identifier.

At 908, the technique 900 includes identifying speaker segments with respective durations in the transcript. A speaker segment is a sequence of consecutive strings in the transcript that have the same speaker identifier. At 910, the technique 900 includes selecting a speaker segment from the transcript based on a respective duration of the speaker segment. In some implementations, the speaker segment is selected from the transcript based on the role identifier. A string may be selected for highlighting from the selected speaker segment based on respective scores of strings in the speaker segment.

Referring to FIG. 10, the technique 1000 for determining respective scores for strings of a transcript based on content of the strings is shown. At 1002, the technique 1000 includes determining respective sentence vectors for strings of the transcript. In some implementations, a sentence vector has elements corresponding to words present in the transcript that are non-zero for words present in the string. For example, a non-zero element of the respective sentence vector for one of the strings of the transcript may be a term frequency-inverse document frequency for a word associated with the non-zero element. For example, a sentence vector for a string may be determined as described in relation to FIG. 17. For example, a sentence vector may be the summation of the vectors of the words in the sentence, while the word vector may be obtained from a neural network model that is pre-trained with large corpus and fine-tuned with customized text.

Figure 18:
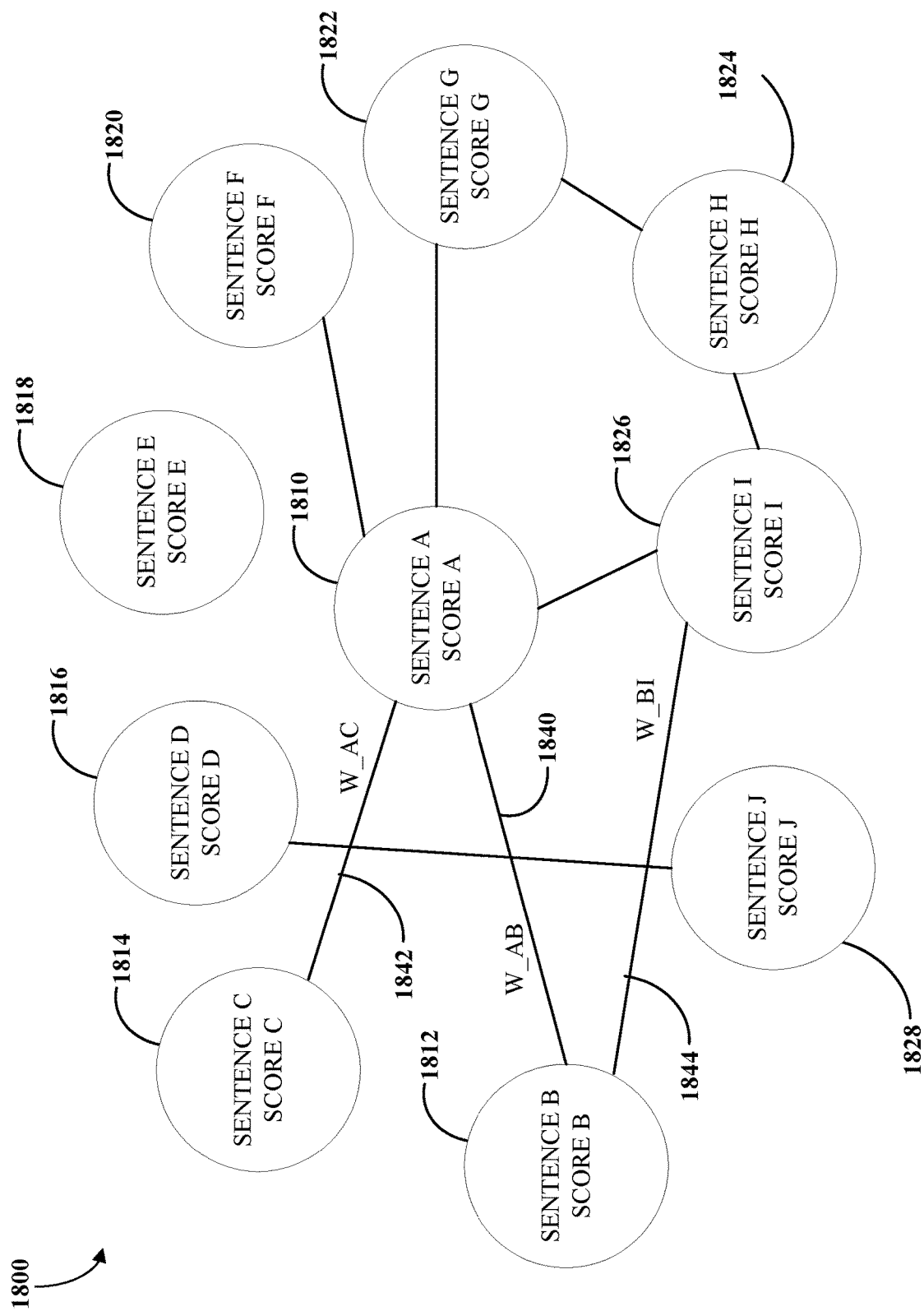
FIG. 18 is an illustration of an example of a graph relating strings of a transcript that can be used for determining respective scores for strings of a transcript based on content of the strings.

At 1004, the technique 1000 includes determining pairwise dot products of the sentence vectors. This may include constructing a graph with vertices corresponding to respective sentence vectors for strings of the transcript and weighted edges between the vertices. The weight of each edge in the graph may be proportional to the pairwise dot product of the sentence vectors for the two vertices that the edge connects. For example, a graph of relationships between strings of the transcript may be constructed as illustrated in FIG. 18. In some implementations, other pairwise similarity scores may be used in combination with or instead of the pairwise dot products to compare sentence vectors for different strings. For example, pairwise similarity scores for the sentence vectors can be determined by one of or combinations of multiple methods such as dot product, cosine similarity, Euclidean Distance, Pearson Correlation, Jaccard Coefficient, and/or Tanimoto Coefficient.

At 1006, the technique 1000 includes determining a respective score for one of the strings based on a sum of the pairwise dot products for the sentence vector of the string. For example, the respective score for a string may be determined based on a sum of the weights for all edges in the graph that connect to the vertex corresponding to the string. These respective scores for the strings may be used to rank and/or select strings for highlighting and potential inclusion in a summary of a conference. In some implementations, a respective score for one of the strings may be determined based on other pairwise similarity scores in combination with or instead of the pairwise dot products. Various techniques may be used to determine the respective score for a string based on the pairwise similarity scores. For example, a respective score for one of the strings may be determined using text-rank algorithm that uses a graph with vertices corresponding to strings of the transcript and edge weights corresponding to the pairwise similarity scores and ranks or scores the strings based on the stationary distribution of a random walk on this graph.

Referring to FIG. 11, the technique 1100 for generating a summary of a video recording of a conference based on highlighting of a transcript of the conference that is highlighted based on analysis of speaker segment durations is shown. At 1102, the technique 1100 includes obtaining a transcript of a conference (e.g., a video conference with two or more participants). The transcript includes strings with respective timestamps and respective speaker identifiers. A respective speaker identifier for a string may indicate which participant in the conference voiced the speech that has been encoded as the string. For example, the speaker identifier may include a participant number (e.g., a number that was assigned to a participant when the participant joined the conference and is unique within the conference). For example, the speaker identifier may include a name for a participant. In some implementations, the speaker identifier includes a globally unique number (e.g., a phone number or a medium access control (MAC) address) associated with a particular user or user device. For example, a speaker identifier may have been determined based on which participant device sent the audio signal encoding the speech of the string to a conference bridge server that hosted the conference. In some implementations, the speaker identifier may have been determined based on analysis (e.g., using a neural network trained to recognize the voices of particular users) of the speech signal that was encoded as the string. For example, the transcript may be encoded as a file (e.g., a text file) that includes timestamps associated with strings. A string may include one or more words delimited by special characters (e.g., spaces and/or punctuation marks). In some implementations, each string encodes a sentence that was spoken during the audio recording of the conference. For example, strings of the transcript may be associated with respective start timestamps, with respective end timestamps, or with both. In some implementations, the transcript may also include additional metadata associated with respective strings. For example, a speaker identifier for a string may be associated with role information for a speaker (e.g., host or non-host participant of the conference). For example, the transcript may be generated from an audio recording of the conference using speech recognition software (e.g., as described in relation to step 504 of the technique 500). For example, the transcript may be retrieved from remote storage (e.g., from the cloud infrastructure 412 via the file server 414) or from local storage. For example, the transcript may be received using a network interface (e.g., the network interface 214). For example, the transcript may be received from a memory (e.g. the memory 204) via a bus (e.g., the bus 206).

At 1104, the technique 1100 includes determining respective scores for strings of the transcript based on content of the strings. For example, the respective scores may be determined using a natural language processing (NLP) technique (e.g., using a machine learning model). The respective scores may be indicative of an importance or relevance of the strings in the context of the transcript of the conference. For example, the respective scores may be used to rank and select strings of the transcript for inclusion in a summary of the conference. For example, determining respective scores for strings of the transcript may include inputting the strings from the transcript to a machine learning model to obtain the respective scores for the strings. In some implementations, a machine learning model (e.g., a PreSumm model) is trained to determine respective scores for strings of the transcript. For example, the machine learning model 2300 of FIG. 23 may be used to determine respective scores for strings of the transcript. In some implementations, strings of the transcript are converted to sentence vectors and pairwise similarity metrics for the sentence vectors are used to determine respective scores for strings of the transcript. For example, the technique 1000 of FIG. 10 may be implemented to determine respective scores for strings of a transcript based on content of the strings.

Figure 19:
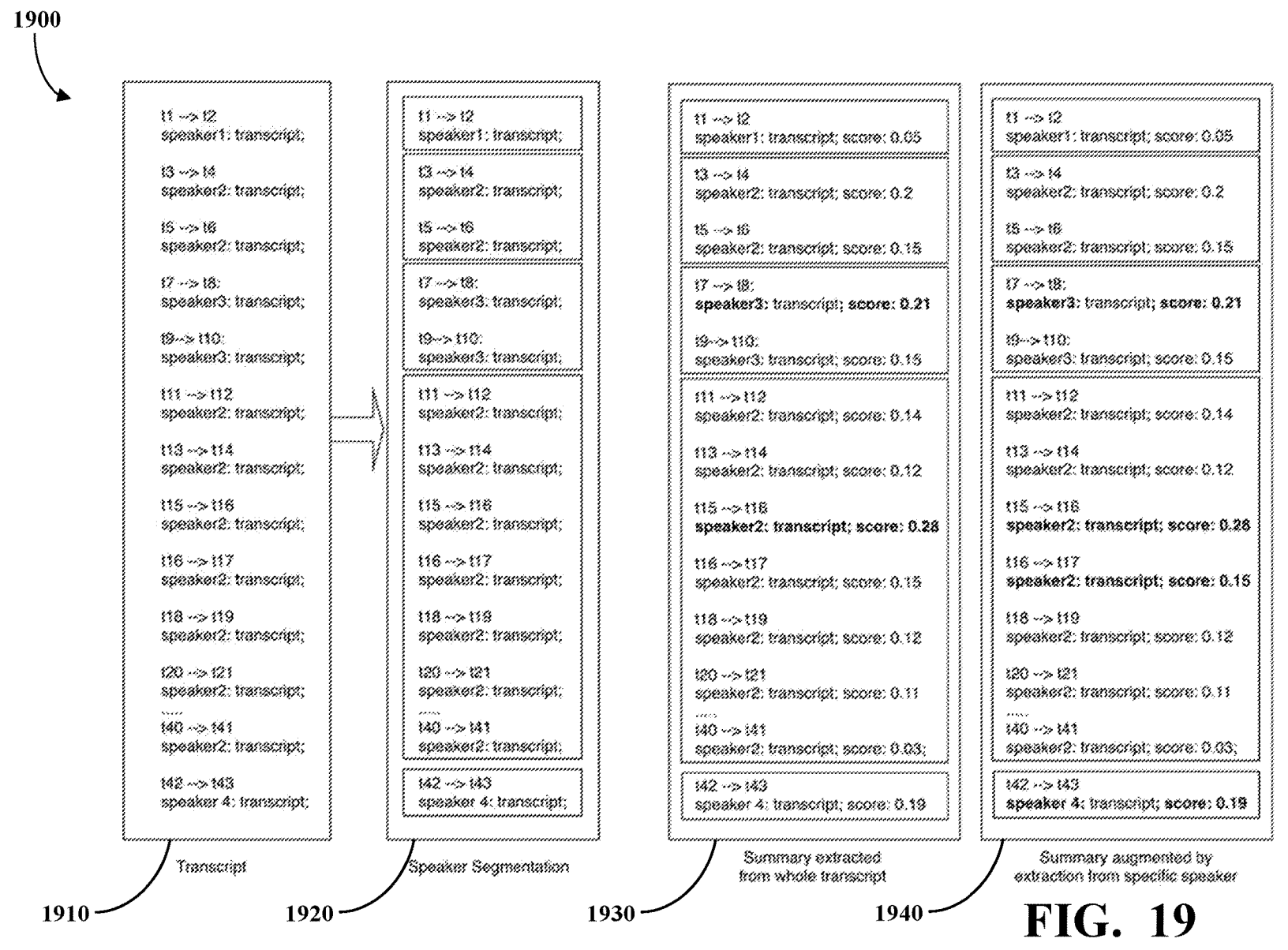

At 1106, the technique 1100 includes identifying speaker segments with respective durations in the transcript. A speaker segment is a sequence of consecutive strings in the transcript that have the same speaker identifier. A speaker segment is associated with a duration in time. For example, a duration for a speaker segment may be determined as a difference between an end timestamp for a last string in the speaker segment and a start timestamp for a first string in the speaker segment. For example, a duration for a speaker segment may be determined as a difference between a timestamp for a first string in a next speaker segment and a timestamp for a first string in the speaker segment. An example of a transcript with speaker segments is illustrated in FIG. 19.

At 1108, the technique 1100 includes selecting a speaker segment from the transcript based on a respective duration of the speaker segment. For example, N speaker segments with the longest durations may be selected, where N is a predetermined number (e.g., 2, 5, or 10). In some implementations, the number of speaker segments, N, selected may be determined dynamically based on a total duration of the conference. For example, a speaker segment may be selected based on the respective duration of the speaker segment exceeding a threshold percentage (e.g., 5% or 10%) of the total duration of the conference. The selected speaker segment may correspond to a significant portion of the conference. In some implementations, the respective speaker identifier for the selected string is associated with a role identifier, and the technique 1100 may include selecting the speaker segment from the transcript based on the role identifier.

At 1110, the technique 1100 includes selecting a string for highlighting from the selected speaker segment based on respective scores of strings in the speaker segment. One or more strings may be selected to be included in a conference summary as representative of the selected speaker segment. For example, a fixed number of strings from the speaker segment with the highest respective scores may be selected. For example, a fixed percentage of the strings from the speaker segment with the highest respective scores may be selected. In some implementations, the respective speaker identifier for the selected string is associated with a role identifier, and the technique 1100 may include selecting a string for highlighting from the speaker segment based on the role identifier. Other information regarding the strings may be used to select strings for highlighting from the selected speaker segment, such as, detecting one or more words from a set of keywords in a string and/or detecting an action item phrase in a string. For example, detecting an action item phrase in a string from the transcript may include inputting the strings from the transcript to a machine learning classifier that has been trained to output predictions of whether a string includes an action item phrase. In some implementations, a smoothing effect may be applied to a selection of highlighted strings. For example, if the time span between two highlighted strings of the transcript is smaller than a configurable time (e.g., 5 seconds), then the technique 1100 may automatically highlight one or more strings occurring between the two highlighted strings of the transcript. For example, technique 1100 may include, responsive to a time span between two highlighted strings of the transcript being smaller than a threshold (e.g., 5 seconds), selecting one or more strings occurring between the two highlighted strings for highlighting. This smoothing of the selection of highlighted strings may serve to make a corresponding video summary more connected. For example, for automatically highlighted strings (e.g., chosen using a text-rank algorithm or a machine learning model), if a time span between an unhighlighted string occurring consecutively before or after a highlighted string is less than a configurable time (e.g., 3 seconds), then the technique 1100 may automatically highlight the unhighlighted string prior or post to the highlighted segment chosen by text rank. For example, technique 1100 may include, responsive to a time span between an unhighlighted string and a highlighted string of the transcript being smaller than a threshold (e.g., 3 seconds), selecting the unhighlighted string for highlighting. For example, a time span between two strings may be determined as a difference between a respective start timestamp of the later string and a respective end timestamp of the earlier string in the transcript.

At 1112, the technique 1100 includes selecting a video excerpt (e.g., a video clip) from a video of the conference based on the respective timestamp of the selected string. The video excerpt may be selected based on one or more transcript timestamps corresponding to a selected string. For example, the video excerpt may include a portion of a video recording of the conference that starts at a respective start timestamp for the selected string of the transcript and ends at a respective end timestamp for the selected string of the transcript. In some implementations (e.g., as described in relation to step 708 of FIG. 7), an audio excerpt of a recording (e.g., an audio track of a video recording or an audio recording of an audio-only telephone call) of the conference may be selected, without image channels of a video.

In some implementations the selected strings are presented to a user in a highlighted transcript and user edits to the highlighting are received and used to adjust which strings are selected for inclusion in a video summary of the conference. For example, the technique 800 of FIG. 8 may be implemented to modify the selection of strings for inclusion in a video summary of the conference.

At 1114, the technique 1100 includes generating a video conference summary as a sequence of video excerpts from the video, including the selected video excerpt. For example, the video conference summary may be generated by the media editor server 440 responsive to a request message from the web server 420. The video conference summary may be presented to a user. For example, the video conference summary may be downloaded by a user (e.g., using the user device 422 to download from the web server 420). For example, the video conference summary may be presented to a user by transmitting the video conference summary to a user device using a network interface (e.g., the network interface 214).

Referring to FIG. 12, the technique 1200 for determining respective scores for strings of a transcript based on content of the strings is shown. For example, the technique 1200 may be used to implement a text rank-based unsupervised summarization method. The technique 1200 takes a transcript 1210 of a conference (e.g., a video conference, an audio conference, or a telephone call with two or more participants) as input. At 1212, the technique 1200 includes sentencing the transcript 1210 to split the transcript 1210 into sentences, with short sentences and stop words removed. Stop words may be common words that tend to convey little relevance in a modelled language, such as, for example, pronouns and articles (e.g., I, we, she, he, them, a, the). For example, strings of the transcript may be modified to remove stop words. Strings that have more than a threshold number of words remaining after stop word removal (e.g., ≥3 words remaining) may be designated as sentences 1214 of the transcript.

At 1216, the technique 1200 includes vectorization to convert the sentences 1214 into sentence vectors 1218. For example, the vectors may be of a dimension equal to the number of words, other than stop words, occurring at least once in the transcript so that a vector 1218 has a single element corresponding to each such word occurring in the transcript. If a sentence 1214 corresponding to a vector 1218 lacks one of these words, the corresponding element of the vector may be set to zero. If a sentence 1214 corresponding to a vector 1218 includes one or more copies of one of these words, the corresponding element of the vector may be set to a non-zero value. For example, the vectors 1218 may be term frequency-inverse document frequency vectors with dimension reduction. For example, the elements of a vector 1218 may be set to a term frequency-inverse document frequency for the corresponding words present in the corresponding sentence 1214. Other sentence vector formats may be used for the vectors 1218, such as, various word embeddings or Bidirectional Encoder Representations from Transformers (BERT) embeddings.

At 1220, the technique 1200 includes determining pairwise similarity of sentence vectors 1218 (e.g., using one or combinations of multiple methods such as dot product, cosine similarity, Euclidean Distance, Pearson Correlation, Jaccard Coefficient, and/or Tanimoto Coefficient). For example, a dot product of sentence vectors 1218 may be determined. In some implementations, a pairwise similarity of two sentences 1214 of the transcript is estimated as proportional to a dot product of the two sentence vectors 1218 corresponding to the two sentences 1214. The resulting pairwise similarity estimates of the sentence vectors 1218 may be used to construct a similarity matrix 1222, which may have rows and columns corresponding to the sentence vectors 1218 and elements which are proportional to pairwise similarity of the sentence vector 1218 corresponding to the row and the sentence vector 1218 corresponding to the column.

At 1224, the technique 1200 includes constructing a graph 1226 according to a text-rank algorithm. The graph 1226 may include sentences 1214 as vertices, with edges connecting vertices that are weighted with similarity scores based on corresponding elements from the similarity matrix 1222 corresponding to the two sentences 1214 that are connected by the edge.

At 1228, the technique 1200 includes ranking the sentences by importance scores. For example, a sentence that is similar with the highest number of sentences may have the highest importance score. In some implementations, the importance score for a sentence is determined based on a sum of the weights for edges in the graph 1226 that are connected to the vertex corresponding to the sentence. In some implementations, the importance scores are obtained by using a text-rank algorithm. First, a graph may be built with vertices corresponding to strings of the transcript and the edge weights based on the pairwise similarity between strings. For example, an importance score for a vertex and its corresponding sentence may be obtained through the text-rank algorithm. A sentence ranking 1230 is determined by sorting the sentences 1214 based on the importance scores for the sentences 1214.

At 1232, the technique 1200 includes selecting sentences for inclusion in a summary 1234 based on the sentence ranking 1230. In some implementations, sentences with the highest rankings in the entire transcript 1210 are selected. In some implementations, sentences with the highest rankings within a selected speaker segment are selected for inclusion in the summary 1234.

Referring to FIG. 13, the technique 1300 for generating a summary of a video recording of a conference based on highlighting of a transcript of the conference is shown. At 1302, the technique 1300 includes obtaining a transcript of a conference (e.g., a video conference, an audio conference, or a telephone call with two or more participants). The transcript includes strings with respective timestamps. For example, the transcript may be encoded as a file (e.g., a text file) that includes timestamps associated with strings. A string may include one or more words delimited by special characters (e.g., spaces and/or punctuation marks). In some implementations, each string encodes a sentence that was spoken during the audio recording of the conference. For example, strings of the transcript may be associated with respective start timestamps, with respective end timestamps, or with both. In some implementations, the transcript may also include additional metadata associated with respective strings. For example, a string of the transcript may be associated with a speaker identifier, which in turn may be associated with role information for a speaker (e.g., host or non-host participant of the conference). For example, the transcript may be generated from an audio recording of the conference using ASR software (e.g., as described in relation to step 504 of the technique 500). For example, the transcript may be retrieved from remote storage (e.g., from the cloud infrastructure 412 via the file server 414) or from local storage. For example, the transcript may be received using a network interface (e.g., the network interface 214). For example, the transcript may be received from a memory (e.g. the memory 204) via a bus (e.g., the bus 206).

At 1304, the technique 1300 includes determining respective sentence vectors for strings of the transcript. A sentence vector may have elements corresponding to words present in the transcript that are proportional to a number of occurrences of the word in the string and inversely proportional to a number of occurrences of the word in the transcript. For example, a non-zero element of the respective sentence vector for one of the strings of the transcript may be a term frequency-inverse document frequency for a word associated with the non-zero element. Some strings of the transcript may be excluded from the set of strings converted into respective sentence vectors. The strings may be filtered by removing stop words and only converting strings with a number of remaining words, after stop word removal, greater than a threshold (e.g., ≥3 words). For example, the technique 1400 of FIG. 14 may be implemented as part of the technique 1300. The modified strings remaining after filtering may be converted to respective sentence vectors. For example, the sentence vectors may be of a dimension equal to the number of words, other than stop words, occurring at least once in the transcript so that a sentence vector has a single element corresponding to each such word occurring in the transcript. If a string corresponding to a sentence vector lacks one of these words, the corresponding element of the sentence vector may be set to zero. If a string corresponding to a sentence vector includes one or more copies of one of these words, the corresponding element of the sentence vector may be set to a non-zero value. As described above, the technique 1300 uses a word frequency based vectorization method. In some implementations, the technique 1300 may be modified to use other methods for vectorization of strings of the transcript. Multiple methods may be utilized to convert text to numeric vectors, such as, word frequency based vectorization or word semantic based vectorization. For example, in a semantics based vectorization method, various pre-trained word embeddings or Bidirectional Encoder Representations from Transformers (BERT) embeddings may be utilized to determine respective sentence vectors for strings of the transcript.

At 1306, the technique 1300 includes determining respective scores for strings of the transcript based on the respective sentence vectors. For example, determining respective scores for strings of the transcript based on the respective sentence vectors may include determining pairwise dot products of the sentence vectors and determining a respective score for one of the strings based on a sum of the pairwise dot products for the sentence vector of the string. In some implementations, determining respective scores for strings of the transcript based on the respective sentence vectors may include constructing a graph (e.g., the graph 1226 of FIG. 12 or the graph 1800 of FIG. 18) with weighted edges whose weights are based on pairwise dot products of the sentence vectors. For example, determining respective scores for strings of the transcript based on the respective sentence vectors may include constructing a similarity matrix based on pairwise dot products of the sentence vectors (e.g., as described in relation to step 1220 of FIG. 12), constructing a graph with vertices corresponding to strings and edges connecting vertices that are weighted with elements from the similarity matrix corresponding to the two sentences that are connected by the edge (e.g., as described in relation to step 1224 of FIG. 12), and determining the respective score for a string as a sum of the weights for edges connected to the vertex for the string (e.g., as described in relation to step 1228 of FIG. 12). In some implementations, other pairwise similarity scores may be used in combination with or instead of the pairwise dot products to compare sentence vectors for different strings. For example, pairwise similarity scores for the sentence vectors can be determined by one of or combinations of multiple methods such as dot product, cosine similarity, Euclidean Distance, Pearson Correlation, Jaccard Coefficient, and/or Tanimoto Coefficient. In some implementations, a respective score for one of the strings may be determined based on other pairwise similarity scores in combination with or instead of the pairwise dot products. For example, a respective score for one of the strings may be determined using text-rank algorithm that uses a graph with vertices corresponding to strings of the transcript and edge weights corresponding to the pairwise similarity scores and ranks or scores the strings based on the stationary distribution of a random walk on this graph. In some implementations, for strings that were excluded from the set of strings for which corresponding sentence vectors were determined, a respective score for a string may be set to zero or some other default value based on the string having less than a threshold number of words remaining (e.g., <3 words) after stop word removal (e.g., as described in relation to FIG. 14).

At 1308, the technique 1300 includes selecting a string for highlighting from the transcript based on respective scores of strings. For example, a fixed number of strings from the transcript with the highest respective scores may be selected. For example, a fixed percentage of the strings from the transcript with the highest respective scores may be selected. In some implementations, the strings of the transcript have respective speaker identifiers, the transcript is analyzed to identify speaker segments of various durations, speaker segments are selected based on their durations, and one or more strings are selected from amongst the strings of a selected speaker segment based on the respective scores of the strings. For example, the technique 1500 of FIG. 15 may be implemented to select one or more strings for highlighting. In some implementations, the respective speaker identifier for the selected string is associated with a role identifier, and the technique 1300 may include selecting a string for highlighting from the transcript based on the role identifier. Other information regarding the strings may be used to select strings for highlighting, such as, detecting one or more words from a set of keywords in a string and/or detecting an action item phrase in a string. For example, selecting a string for highlighting from the transcript may include detecting one or more words from a set of keywords in a string from the transcript. The selected string may be selected based on presence of the one or more words from the set of keywords. For example, selecting a string for highlighting from the transcript may include detecting an action item phrase in a string from the transcript. The selected string may be selected based on presence of the action item phrase. In some implementations, detecting an action item phrase in a string from the transcript may include inputting the strings from the transcript to a machine learning classifier that has been trained to output predictions of whether a string includes an action item phrase. In some implementations, a smoothing effect may be applied to a selection of highlighted strings. For example, if the time span between two highlighted strings of the transcript is smaller than a configurable time (e.g., 5 seconds), then the technique 1300 may automatically highlight one or more strings occurring between the two highlighted strings of the transcript. For example, technique 1300 may include, responsive to a time span between two highlighted strings of the transcript being smaller than a threshold (e.g., 5 seconds), selecting one or more strings occurring between the two highlighted strings for highlighting. This smoothing of the selection of highlighted strings may serve to make a corresponding video summary more connected. For example, for automatically highlighted strings (e.g., chosen using a text-rank algorithm or a machine learning model), if a time span between an unhighlighted string occurring consecutively before or after a highlighted string is less than a configurable time (e.g., 3 seconds), then the technique 1300 may automatically highlight the unhighlighted string prior or post to the highlighted segment chosen by text rank. For example, technique 1300 may include, responsive to a time span between an unhighlighted string and a highlighted string of the transcript being smaller than a threshold (e.g., 3 seconds), selecting the unhighlighted string for highlighting. For example, a time span between two strings may be determined as a difference between a respective start timestamp of the later string and a respective end timestamp of the earlier string in the transcript.

At 1310, the technique 1300 includes selecting a video excerpt (e.g., a video clip) from a video of the conference based on the respective timestamp of the selected string. The video excerpt may be selected based on one or more transcript timestamps corresponding to a selected string. For example, the video excerpt may include a portion of a video recording of the conference that starts at a respective start timestamp for the selected string of the transcript and ends at a respective end timestamp for the selected string of the transcript. In some implementations (e.g., as described in relation to step 708 of FIG. 7), an audio excerpt of a recording (e.g., an audio track of a video recording or an audio recording of an audio-only telephone call) of the conference may be selected, without image channels of a video.

In some implementations the selected strings are presented to a user in a highlighted transcript and user edits to the highlighting are received and used to adjust which strings are selected for inclusion in a video summary of the conference. For example, the technique 800 of FIG. 8 may be implemented to modify the selection of strings for inclusion in a video summary of the conference.

At 1312, the technique 1300 includes generating a video conference summary as a sequence of video excerpts from the video, including the selected video excerpt. For example, the video conference summary may be generated by the media editor server 440 responsive to a request message from the web server 420. The video conference summary may be presented to a user. For example, the video conference summary may be downloaded by a user (e.g., using the user device 422 to download from the web server 420). For example, the video conference summary may be presented to a user by transmitting the video conference summary to a user device using a network interface (e.g., the network interface 214). In some implementations (e.g., as described in relation to step 710 of FIG. 7), an audio conference summary may be generated as a sequence of audio excerpts from a recording (e.g., an audio track of a video recording or an audio recording of an audio-only telephone call) of the conference, without image channels of a video.

Referring to FIG. 14, the technique 1400 for determining respective sentence vectors for strings of a transcript is shown. At 1402, the technique 1400 includes removing stop words from the strings of the transcript. Stop words may be common words that tend to convey little conference in a modelled language, such as, for example, pronouns and articles (e.g., I, we, she, he, them, a, the). At 1404, the technique 1400 includes selecting strings of the transcript with a number of remaining words, after stop words are removed, greater than a threshold (e.g., ≥3 words remaining) for determination of respective sentence vectors. These sentence vectors may be used to determine respective scores for the selected strings.

At 1406, the technique 1400 includes determining respective scores for strings of the transcript based on a number of remaining words, after stop words are removed, being less than a threshold (e.g., <3 words remaining). For example, strings with less than the threshold number of remaining words may have their respective scores set to zero.

Referring to FIG. 15, the technique 1500 for selecting strings of a transcript for highlighting based on analysis of speaker segment durations is shown. In some implementations, the strings of a transcript have respective speaker identifiers that indicate which participant in a conference (e.g., a video conference, an audio conference, or an audio only call) voiced the words of a string. At 1502, the technique 1500 includes identifying speaker segments with respective durations in the transcript. A speaker segment is a sequence of consecutive strings in the transcript that have the same speaker identifier. A speaker segment is associated with a duration in time. For example, a long duration speaker segment may correspond to a long speech by a participant in the conference. For example, a duration for a speaker segment may be determined as a difference between an end timestamp for a last string in the speaker segment and a start timestamp for a first string in the speaker segment. For example, a duration for a speaker segment may be determined as a difference between a timestamp for a first string in a next speaker segment and a timestamp for a first string in the speaker segment. An example of a transcript with speaker segments is illustrated in FIG. 19.

At 1504, the technique 1500 includes selecting a speaker segment from the transcript based on a respective duration of the speaker segment. For example, N speaker segments with the longest durations may be selected, where N is a predetermined number (e.g., 2, 5, or 10). In some implementations, the number of speaker segments, N, selected may be determined dynamically based on a total duration of the conference. For example, a speaker segment may be selected based on the respective duration of the speaker segment exceeding a threshold percentage (e.g., 5% or 10%) of the total duration of the conference. The selected speaker segment may correspond to a significant portion of the conference. In some implementations, the respective speaker identifier for strings of a speaker segment is associated with a role identifier, and the technique 1500 may include selecting the speaker segment from the transcript based on the role identifier.

At 1506, the technique 1500 includes selecting a string for highlighting from the selected speaker segment based on respective scores of strings in the speaker segment. One or more strings may be selected to be included in a conference summary as representative of the selected speaker segment. For example, a fixed number of strings from the speaker segment with the highest respective scores may be selected. For example, a fixed percentage of the strings from the speaker segment with the highest respective scores may be selected. In some implementations, the respective speaker identifier for the selected string is associated with a role identifier, and the technique 1500 may include selecting a string for highlighting from the speaker segment based on the role identifier. Other information regarding the strings may be used to select strings for highlighting from the selected speaker segment, such as, detecting one or more words from a set of keywords in a string and/or detecting an action item phrase in a string. For example, detecting an action item phrase in a string from the transcript may include inputting the strings from the transcript to a machine learning classifier that has been trained to output predictions of whether a string includes an action item phrase.

FIG. 16 is an illustration of an example of a transcript 1600 of a conference (e.g., a video conference, an audio conference, or a telephone call with two or more participants). The transcript 1600 may have been transcribed from conference recording audio (e.g., an audio track of a video recording or an audio recording of an audio-only telephone call). The whole transcription is truncated into different sections. Each section includes a string of text transcribed from the continuous speech of a specific speaker, a start timestamp, a stop timestamp, and speaker identifier. In this example, the speaker identifiers are encoded as names of participants.

Figure 17:
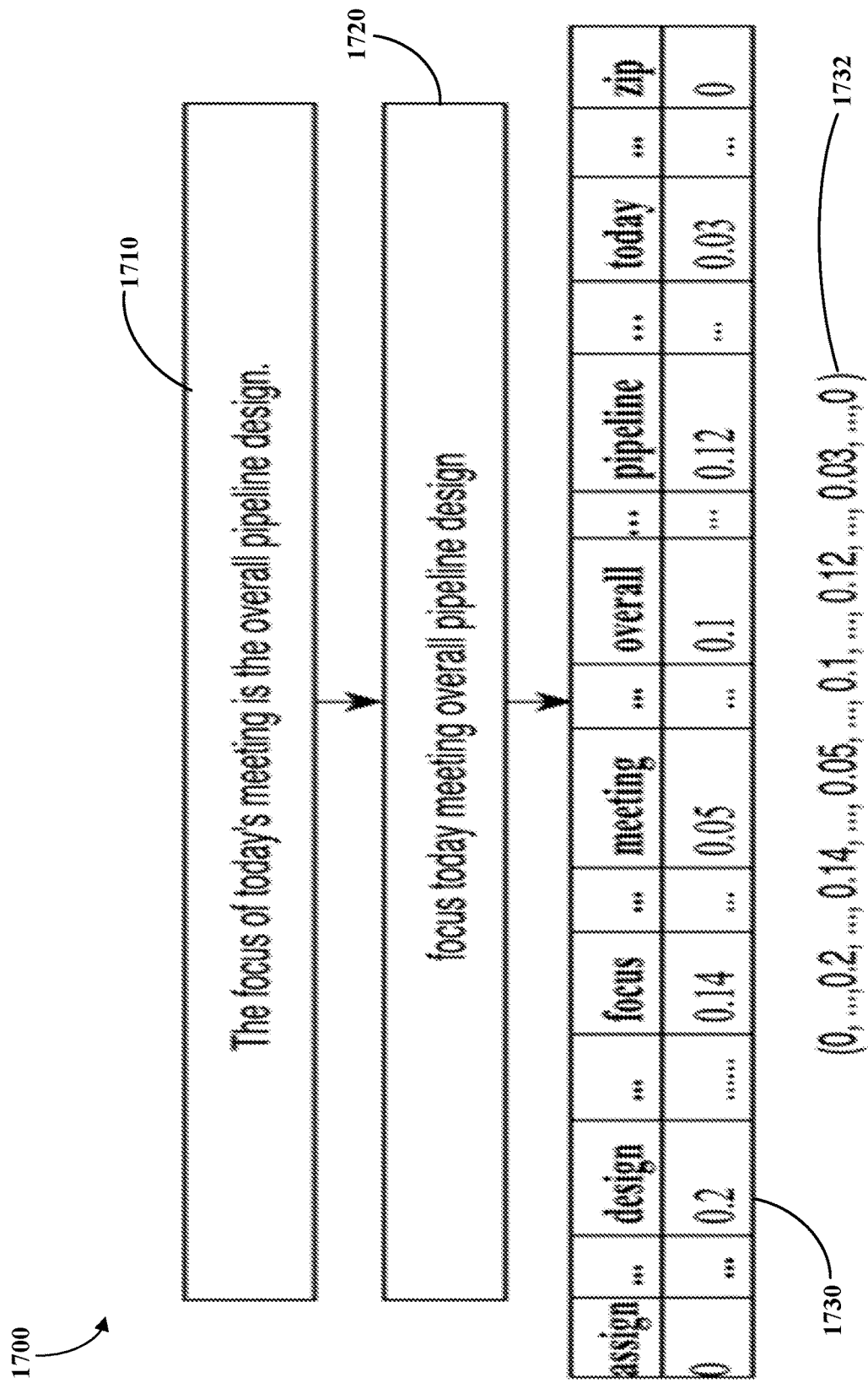
FIG. 17 is an illustration of an example of a technique for stop word removal and term frequency-inverse document frequency vectorization.

FIG. 17 is an illustration of an example of a technique 1700 for stop word removal and term frequency-inverse document frequency vectorization. A string 1710 from a transcript of a conference is received as input. The stop words "the", "of", "'s", and "is" are removed from string 1710 to obtain a modified string 1720 with stop words removed. The modified string 1720 is then converted into a sentence vector 1730 for the string 1710. The dimension of the sentence vector 1730 is equal to the number of words, other than stop words, appearing in the entire transcript of the conference from which the string 1710 was taken. The elements of the sentence vector 1730 corresponding to each of the six words in the modified string 1720 are set to a term frequency-inverse document frequency for that word, which is proportional to the number of occurrences of the word in the modified string 1720 and inversely proportional to the number of occurrences of the word in the entire transcript. The sentence vector 1730 may be sparse vector and may be encoded in a variety of ways. For example, the sentence vector 1730 may be encoded as a comma separated value list 1732.

FIG. 18 is an illustration of an example of a graph 1800 relating strings of a transcript that can be used for determining respective scores for strings of a transcript based on content of the strings. The nodes or vertices (1810-1828) of the graph 1800 represent strings (e.g. sentences) of the transcript of a conference. The edges (1840-1844) of the graph 1800 are weighted with weights corresponding to similarity scores between two strings corresponding to the vertices connected by an edge. For example, the weight for the edge 1840 may be determined based on a pairwise dot product between respective sentence vectors for a sentence A of string associated with the vertex 1810 and a sentence B of a string associated with the vertex 1812. For example, the weight for the edge 1840 may be determined based on a pairwise similarity score (e.g., determined by one of or combinations of multiple methods such as dot product, cosine similarity, Euclidean Distance, Pearson Correlation, Jaccard Coefficient, and/or Tanimoto Coefficient) between respective sentence vectors for a sentence A of string associated with the vertex 1810 and a sentence B of a string associated with the vertex 1812. The graph 1800 lacks an edge that directly connects two vertices associated with two strings that do not share any common words (other than stop words). These missing edges may be equivalent to edges with weights (e.g., similarity scores) equal to zero. An importance or relevance of a string may be obtained from the graph using a text-rank algorithm. In some implementations, each vertex of the graph 1800 may have a score that is determined based on the weights of all the edges that connect to that vertex. For example, the score B of the vertex 1812 may be determined based on a sum of the weight W_AB of the edge 1840 and the weight W_BI of the edge 1844.

After the strings of a transcript are ranked, summaries may be selected according to an importance score across the whole transcript. In contrast to text only summarization, a transcript can also provide valuable metadata, such as speaker identification, speaker role, and timestamp information. Therefore, the summarization capability may be enhanced by augmenting the highlights selected for conference summary with extractions from specific speakers who speak continuously over a long period of time. For example, a percentage of extraction for the whole transcript and a percentage of extraction for each speaker can be passed to the model as a pre-defined parameter.

In some implementations, summaries are extracted from specific speakers as follows. First, speaker segments are grouped in order of time duration for a specific speaker. Second, segments with the number of sentences exceeding a threshold are found and the top ranked sentences are selected from that segment. The number of the sentences selected may be based on the predefined percentage.

FIG. 19 is an illustration of an example of a technique 1900 for summarization of a transcript using speaker segments that have been identified in the transcript 1910 of a conference (e.g., a video conference, an audio conference, or a telephone call with two or more participants). The transcript 1910 includes strings with respective timestamps and respective speaker identifiers (e.g., "speaker 1," "speaker 2," "speaker 3," and "speaker 4,"). At 1920, speaker segmentation is performed to identify the speaker segments occurring in the transcript 1900. A speaker segment is a sequence of consecutive strings in the transcript that have the same speaker identifier. At 1920, the identified speaker segments are shown enclosed in boxes. At 1930, respective scores are determined for the strings of the transcript 1910 and strings with the highest scores across the whole transcript 1910 are selected (shown highlighted in bold) for inclusion in summary of the conference, including all strings with a scores at or above 0.19. At 1940, the summary is augmented by additional extraction from a long speaker segment. At 1940, the fourth string of the longest speaker segment, which has a score of 0.15, is selected (shown highlighted in bold) for inclusion in the augmented summary of the conference. In this example, this string with a score 0.15 is not selected from the whole transcript, but since the speaker segment containing that string has a duration that exceeds a certain threshold, more strings from the speaker segment are added.

Supervised deep learning model may be used for extractive text summarization. For example, an initial natural language processing model may be employed (e.g., using an unsupervised machine learning method), and user feedback data may be provided in response to its results and used to train a summarization model with supervised learning methods. In some implementations, a speaker role-based PreSumm model may be trained using a supervised learning approach for extractive summarization of transcripts. For example, a PreSumm supervised summarization model may be used that includes conference participant role features in an embedding.

Figure 20:
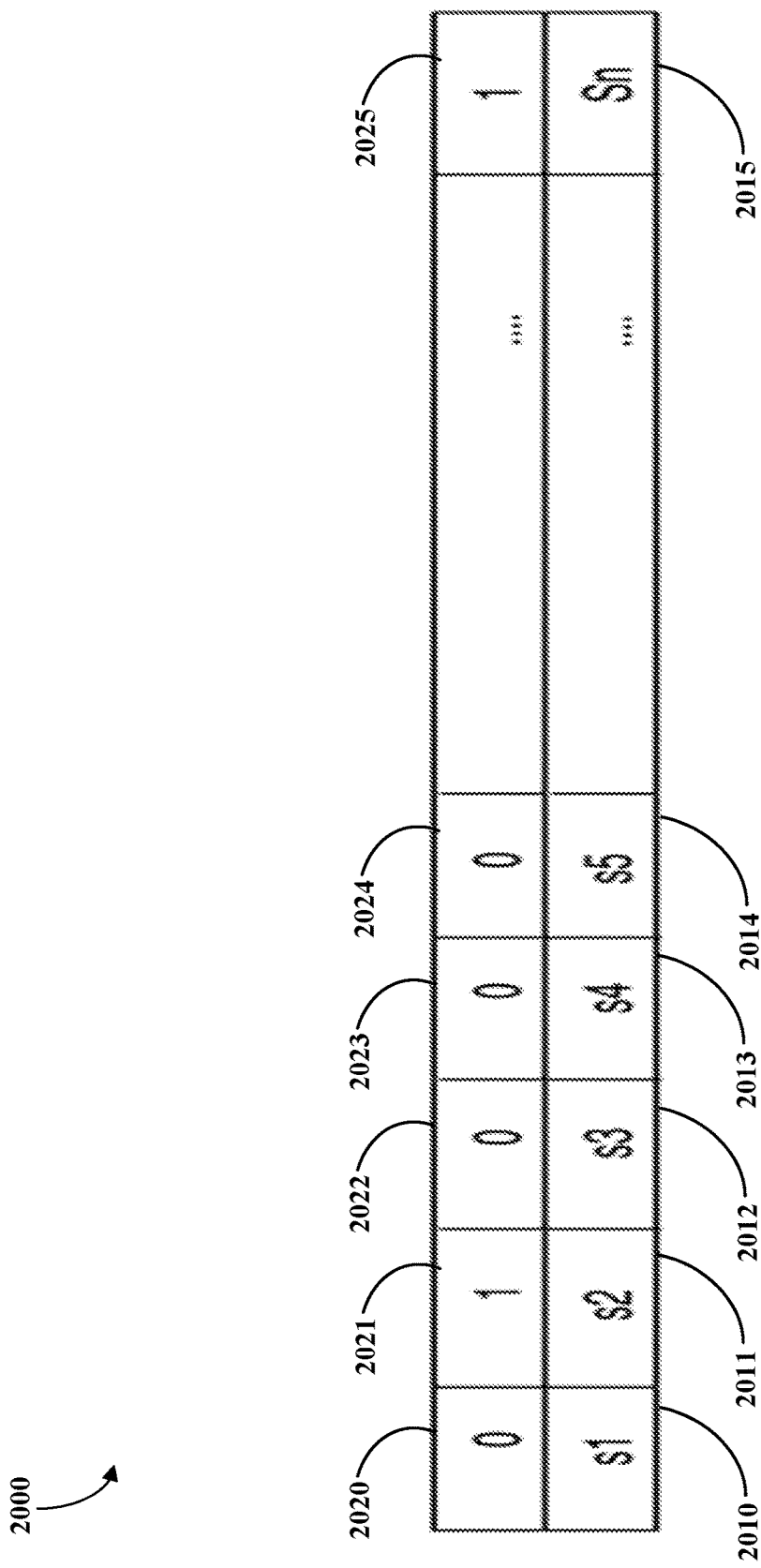
FIG. 20 is an illustration of an example of a corpus of training data for training a machine learning model to score or classify strings in a transcript of a conference.

FIG. 20 is an illustration of an example of a corpus of training data 2000 for training a machine learning model to score or classify strings in a transcript of a conference. The corpus of training data 2000 includes N strings (e.g., sentences), including strings 2010 through 2015. Each string has a corresponding binary label, including the labels 2020 through 2025, that indicate whether the corresponding string is considered important or relevant. In this example, for each string, a label of 1 represents the string is important and should be included in a summary of a transcript, while 0 indicates the string (e.g., a sentence) should not be selected as part of a summary.

Before model training, the input may be truncated into segments of a certain length, which can be passed as a parameter to the model. The segment is different from the speaker segmentation discussed above (e.g., as discussed in relation to FIG. 11). Here the segmentation of the sequence of strings in a transcript is based on the length of the strings in words. The strings (e.g. sentences) at the boundaries are those such that adding one more sentence to the segment will cause the number of words in the segment to exceed a fixed length of the segment in words. In some implementations, for each segment, if the number of words in the segment is less than the fixed length, the segment may be filled up with a specific character (e.g., a reserved character).

Figure 21:
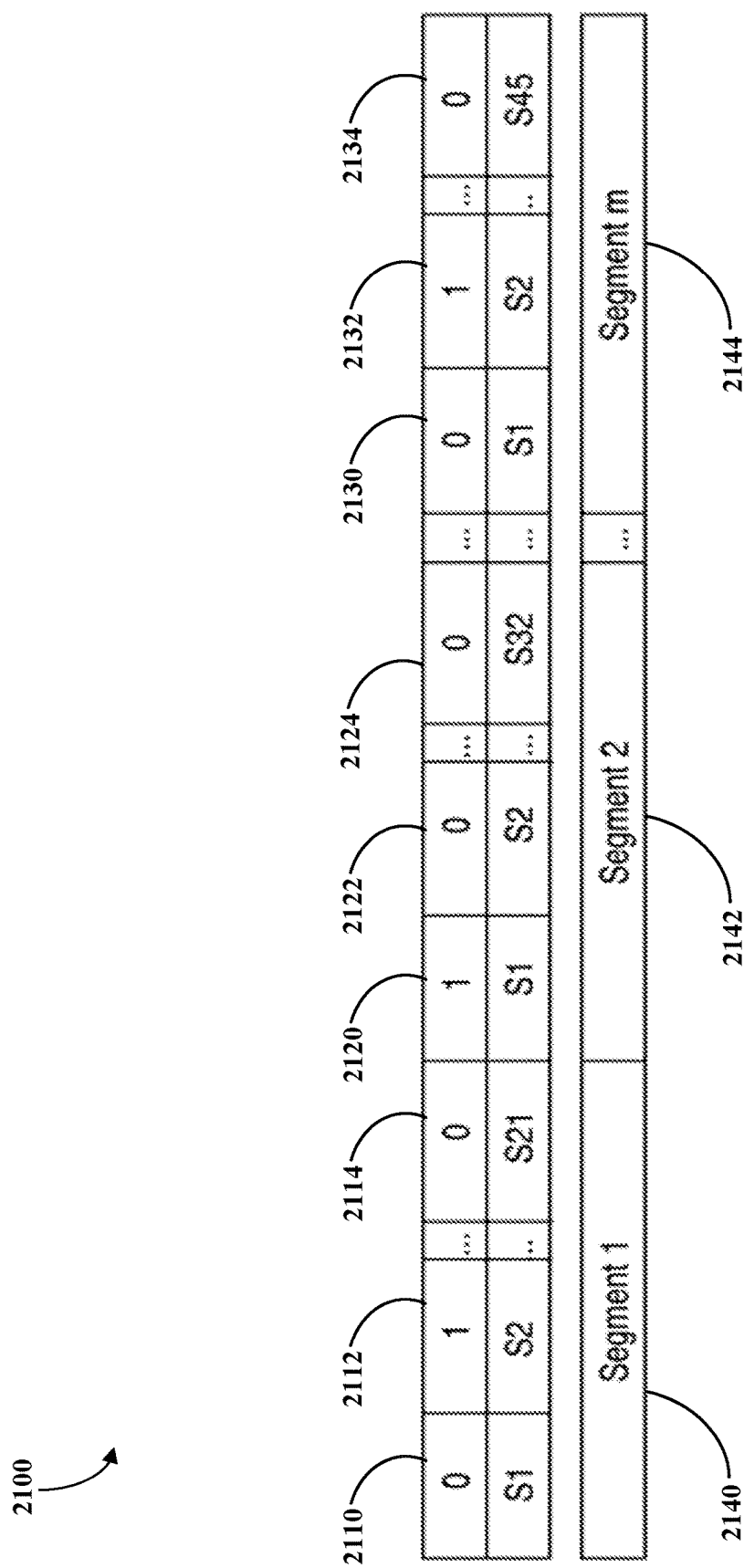
FIG. 21 is an illustration of an example of a partitioning a corpus of training data into segments made up of one or more strings that may be input together into a machine learning model.

FIG. 21 is an illustration of an example of a partitioning a corpus of training data 2100 into segments made up of one or more strings that may be input together into a machine learning model. FIG. 21 shows the training data after segmentation. The training data 2100 includes a set strings with respective labels (e.g., including the strings 2110, 2112, 2114, 2120, 2122, 2124, 2130, 2132, and 2134). In this example, the strings of the training data 2100 are partitioned into three segments 2140, 2142, and 2144. The strings 2110, 2112, and 2114 are included in the first segment 2140. The strings 2120, 2122, and 2124 are included in the second segment 2142. The strings 2130, 2132, and 2134 are included in the third segment 2144. For example, the number of words in each segment may be forced to be less than a certain threshold.

Given the segments to be summarized and the labels indicating whether a sentence is a summary or not, the model may be trained to distinguish whether a string (e.g., a sentence) is a summary or not based on the input segment by learning all the parameters in the model. The overall picture of how the model will learn from the training data 2100 based on the segmentation is depicted in FIG. 22 The overall picture of how the model will learn from the training data may be based on the segmentation.

Figure 22:
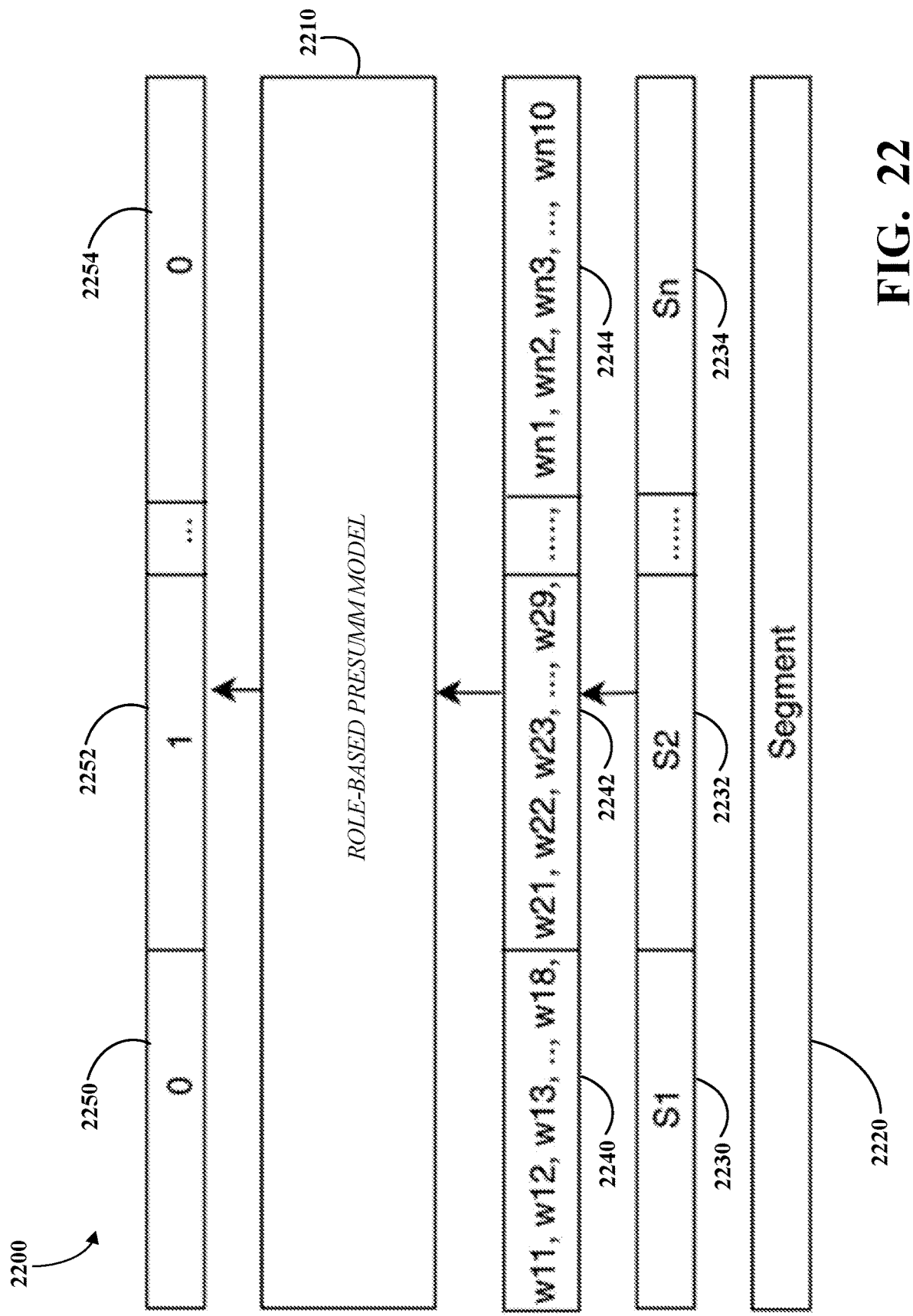
FIG. 22 is an illustration of an example of a machine learning model to score or classify strings in a transcript of a conference.
Figure 23:
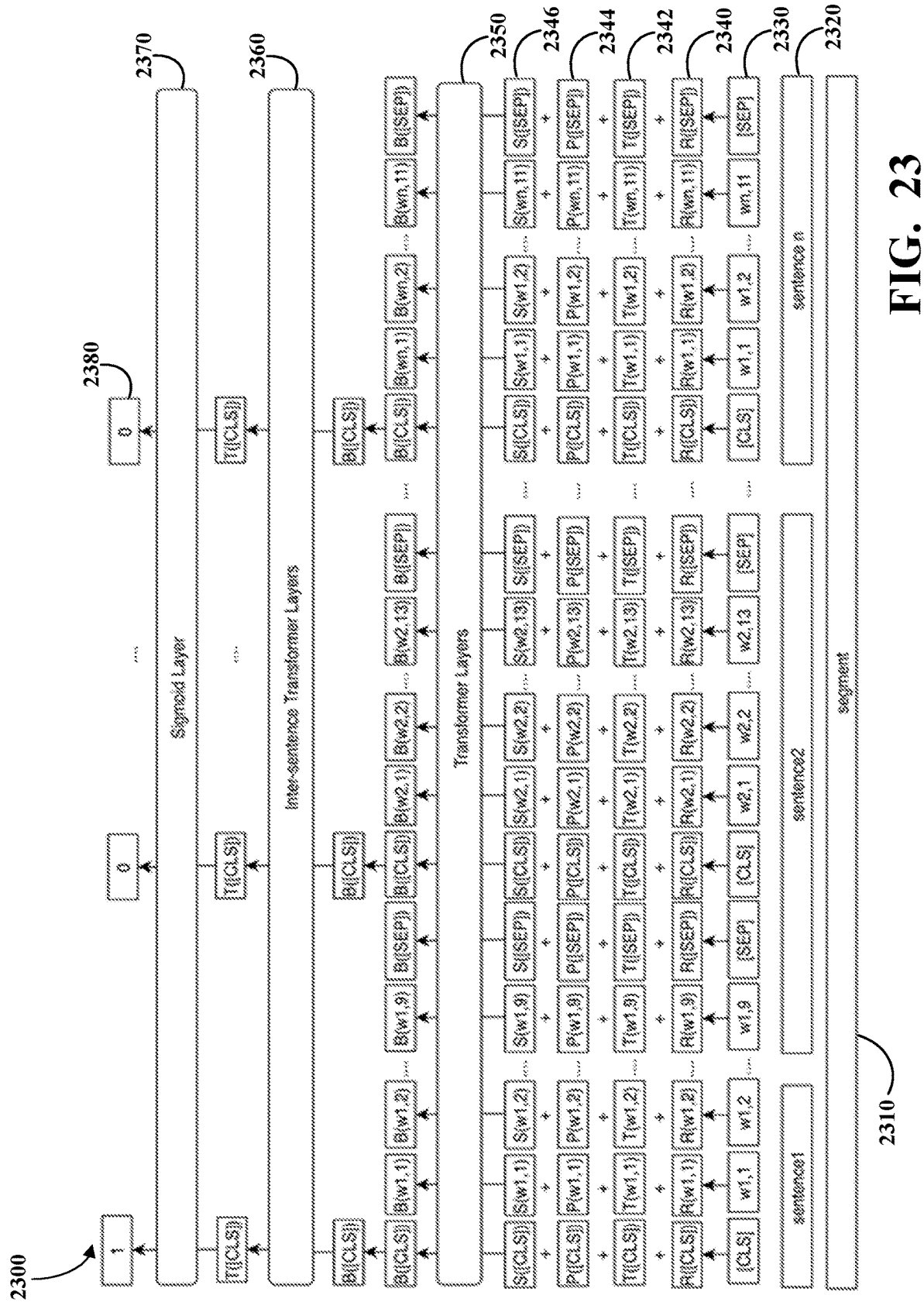
FIG. 23 is an illustration of an example of a machine learning model using a PreSumm model with a speaker role embedding to score or classify strings in a transcript of a conference.

FIG. 22 is an illustration of an example of a machine learning model 2200 to score or classify strings in a transcript of a conference. The machine learning model 2200 includes a role-based PreSumm model 2210. The machine learning model 2200 takes a segment 2220 of strings as input. The segment 2220 includes a sequence of N labeled strings, including the string 2230 the string 2232, and the string the 2234. The string 2230 is represented as a sequence of word tokens 2240. The string 2232 is represented as a sequence of word tokens 2242. The string 2234 is represented as a sequence of word tokens 2244. When the words 2240, 2242, and 2244 of the segment 2220 are input together into the machine learning model 2200, the machine learning model 2200 outputs respective predictions (e.g., 2250, 2252, and 2254) for each of the strings 2230, 2232, and 2234 of the segment 2220. FIG. 23 shows a more detailed architecture of an example of role-based PreSumm model trained on all the available segments of training data. FIG. 23 is an illustration of an example of a machine learning model 2300 using a PreSumm model with a speaker role embedding to score or classify strings in a transcript of a conference. The machine learning model 2300 takes a segment 2310 as input. The segment 2310 includes a sequence of strings 2320, which in turn include sequences of words 2330.

The words 2330 of the segment 2310 are passed through an embedding layer that is the summation of four embeddings 2340, 2342, 2344, and 2346. The embedding 2340 encodes speaker role information for the strings 2320. For the conference scenario, the speaker role information may be very useful in determining a summarization. Speaker role information may include various metadata about a speaker associated with a string of the transcript, such as, for example, whether the speaker a host of the conference or a non-host participant. The other embeddings used include a token embedding 2342, a position embedding 2344, and a segment embedding 2346. The machine learning model 2300 also includes transformer layers 2350, inter-sentence transformer layers 2360, and a sigmoid layer 2370, which outputs a set of predictions 2380 for each string 2320 (e.g., each sentence) of the segment 2310. The predictions 2380 may indicate whether the string is important or relevant enough to warrant inclusion in summary of a conference (e.g., a video conference, an audio conference, or a telephone call with two or more participants). In some implementations, the predictions 2380 are binary classifications of a string as important or not. In some implementations, the predictions 2380 vary continuously (e.g., subject to some digital precision) in a range (e.g., in a range from 0 to 1 or from −1 to 1). For example, respective scores for the strings 2320 may be determined based on the predictions 2380.

Figure 24:
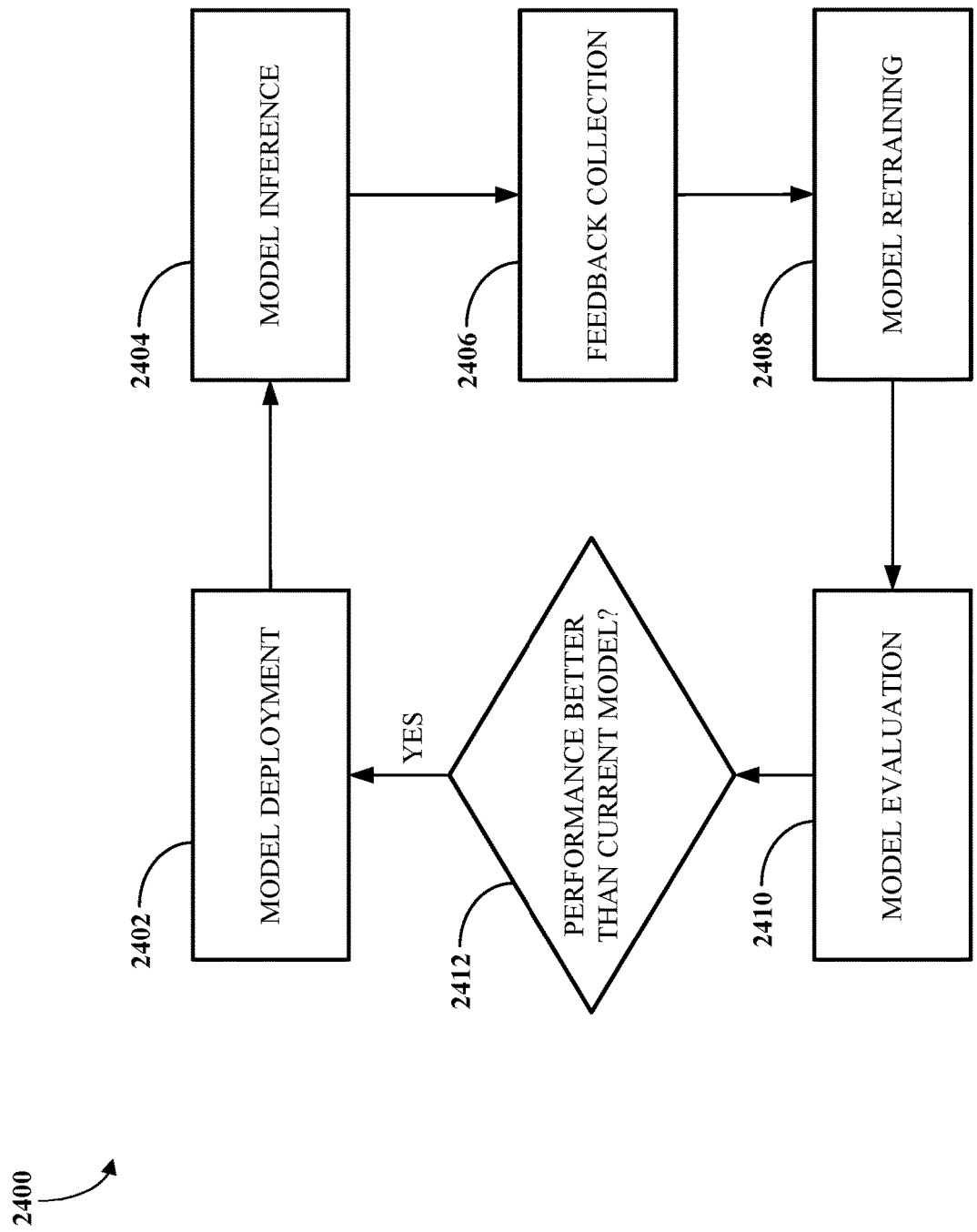
FIG. 24 is a flowchart of an example of a technique for retraining a machine learning model based on user feedback.

FIG. 24 is a flowchart of an example of a technique 2400 for retraining a machine learning model based on user feedback. A machine learning model, such as the machine learning model 2300 may be retrained periodically with the new user feedback when the historical data becomes outdated. At 2402, the technique 2400 includes model deployment, which may include an in the installation of a trained machine learning model in unified communications system (e.g., as software running on the natural language processing server 430). At 2404, the machine learning model is applied to user data in an inference phase to determine predictions or scores that can be used to select strings from transcripts of conferences for inclusion in conference summaries.

At 2406, user feedback is collected when users are presented with highlighting or other forms of summary that was determined using the machine learning module. At 2408, the machine learning model is retrained using this user feedback as a source of labels for supervised learning (e.g., using a back propagation algorithm for retraining). At 2410, the retrained machine learning model is evaluated. For example, the retrained model may be evaluated using a subset of the training data (e.g., testing data) based user feedback that was reserved for evaluation purposes. At 2412, if the performance of the retrained machine learning model is better than currently deployed machine learning model, then, at 2402, the newly retrained machine learning model may be deployed for use in the system (e.g., the system 400 of FIG. 4). Otherwise, the newly retrained machine learning model may be disregarded, and the current machine learning model may continue to be used.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   obtaining a transcript of a conference, wherein the transcript includes strings with respective timestamps and respective speaker identifiers;
   determining, using a processing apparatus, respective scores for strings of the transcript based on content of the strings;
   identifying speaker segments with respective durations in the transcript, wherein a speaker segment is a sequence of consecutive strings in the transcript that have the same speaker identifier;
   selecting a speaker segment from the transcript based on a respective duration of the speaker segment;
   selecting a string for highlighting from the selected speaker segment based on respective scores of strings in the speaker segment;
   selecting a video excerpt from a video of the conference based on the respective timestamp of the selected string; and
   generating a video conference summary as a sequence of video excerpts from the video, including the selected video excerpt.

2. The method of claim 1, wherein determining respective scores for strings of the transcript based on content of the strings comprises:
   inputting the strings from the transcript to a machine learning model to obtain the respective scores for the strings.

3. The method of claim 1, comprising:
   responsive to a time span between two highlighted strings of the transcript being smaller than a threshold, selecting one or more strings occurring between the two highlighted strings for highlighting.

4. The method of claim 1, comprising:
   responsive to a time span between an unhighlighted string and a highlighted string of the transcript being smaller than a threshold, selecting the unhighlighted string for highlighting.

5. The method of claim 1, wherein the respective speaker identifier for the selected string is associated with a role identifier, and further comprising:
   selecting the speaker segment from the transcript based on the role identifier.

6. The method of claim 1, further comprising:
   generating a highlighted transcript as a copy of the transcript with a subset of the strings highlighted, wherein the selected string is highlighted;
   presenting the highlighted transcript to a user;
   receiving user edits to the highlighting of the highlighted transcript; and
   selecting a video excerpt from the video of the conference based on the respective timestamp of a string selected based on the user edits to the highlighting.

7. The method of claim 1, further comprising:
   detecting one or more words from a set of keywords in a string from the transcript, wherein the selected string is selected based on presence of the one or more words from the set of keywords.

8. The method of claim 1, further comprising:
   detecting an action item phrase in a string from the transcript, wherein the selected string is selected based on presence of the action item phrase.

9. The method of claim 8, wherein detecting an action item phrase in a string from the transcript comprises:
   inputting the strings from the transcript to a machine learning classifier that has been trained to output predictions of whether a string includes an action item phrase.

10. A system comprising:
    a processor, and
    a memory, wherein the memory stores instructions executable by the processor to:
       obtain a transcript of a conference, wherein the transcript includes strings with respective timestamps and respective speaker identifiers;
       determine respective scores for strings of the transcript based on content of the strings;
       identify speaker segments with respective durations in the transcript, wherein a speaker segment is a sequence of consecutive strings in the transcript that have the same speaker identifier;
       select a speaker segment from the transcript based on a respective duration of the speaker segment;
       select a string for highlighting from the selected speaker segment based on respective scores of strings in the speaker segment;
       select a video excerpt from a video of the conference based on the respective timestamp of the selected string; and
       generate a video conference summary as a sequence of video excerpts from the video, including the selected video excerpt.

11. The system of claim 10, wherein the memory stores instructions executable by the processor to:
input the strings from the transcript to a machine learning model to obtain the respective scores for the strings.

12. The system of claim 10, wherein the memory stores instructions executable by the processor to:
determine respective sentence vectors for the strings of the transcript; wherein a sentence vector has elements corresponding to words present in the transcript that are non-zero for words present in the string;
determine pairwise dot products of the sentence vectors; and
determine a respective score for one of the strings based on a sum of the pairwise dot products for the sentence vector of the string.

13. The system of claim 12, wherein a non-zero element of the respective sentence vector for one of the strings of the transcript is a term frequency-inverse document frequency for a word associated with the non-zero element.

14. The system of claim 10, wherein the memory stores instructions executable by the processor to:
generate a highlighted transcript as a copy of the transcript with a subset of the strings highlighted, wherein the selected string is highlighted;
present the highlighted transcript to a user;
receive user edits to the highlighting of the highlighted transcript; and
select a video excerpt from the video of the conference based on the respective timestamp of a string selected based on the user edits to the highlighting.

15. The system of claim 10, the respective speaker identifier for the selected string is associated with a role identifier, and the memory stores instructions executable by the processor to:
select the speaker segment from the transcript based on the role identifier.

16. A non-transitory computer-readable storage medium, comprising executable instructions that, when executed by a processor, facilitate performance of operations, comprising:
obtaining a transcript of a conference, wherein the transcript includes strings with respective timestamps and respective speaker identifiers;
determining respective scores for strings of the transcript based on content of the strings;
identifying speaker segments with respective durations in the transcript, wherein a speaker segment is a sequence of consecutive strings in the transcript that have the same speaker identifier;
selecting a speaker segment from the transcript based on a respective duration of the speaker segment;
selecting a string for highlighting from the selected speaker segment based on respective scores of strings in the speaker segment;
selecting a video excerpt from a video of the conference based on the respective timestamp of the selected string; and
generating a video conference summary as a sequence of video excerpts from the video, including the selected video excerpt.

17. The non-transitory computer-readable storage medium of claim 16, wherein determining respective scores for strings of the transcript based on content of the strings comprises:
inputting the strings from the transcript to a machine learning model to obtain the respective scores for the strings.

18. The non-transitory computer-readable storage medium of claim 16, wherein determining respective scores for strings of the transcript based on content of the strings comprises:
determining respective sentence vectors for the strings of the transcript, wherein a sentence vector has elements corresponding to words present in the transcript that are non-zero for words present in the string;
determining pairwise dot products of the sentence vectors; and
determining a respective score for one of the strings based on a sum of the pairwise dot products for the sentence vector of the string.

19. The non-transitory computer-readable storage medium of claim 18, wherein a non-zero element of the respective sentence vector for one of the strings of the transcript is a term frequency-inverse document frequency for a word associated with the non-zero element.

20. The non-transitory computer-readable storage medium of claim 16, wherein the respective speaker identifier for the selected string is associated with a role identifier, and further comprising executable instructions that, when executed by a processor, facilitate performance of operations, comprising:
selecting the speaker segment from the transcript based on the role identifier.

* * * * *